(12) United States Patent
Xu et al.

(10) Patent No.: US 8,174,762 B2
(45) Date of Patent: *May 8, 2012

(54) 3-D OPTICAL MICROSCOPE

(75) Inventors: James Jianguo Xu, San Jose, CA (US);
Ken Kinsun Lee, Los Altos Hills, CA (US)

(73) Assignee: Zeta Instruments, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/699,824

(22) Filed: Feb. 3, 2010

(65) Prior Publication Data

US 2010/0135573 A1 Jun. 3, 2010

Related U.S. Application Data

(62) Division of application No. 11/754,282, filed on May 26, 2007, now Pat. No. 7,729,049.

(51) Int. Cl.
*G02B 21/00* (2006.01)

(52) U.S. Cl. .................... 359/383; 359/381; 345/419

(58) Field of Classification Search .......... None
See application file for complete search history.

(56) References Cited

U.S. PATENT DOCUMENTS

| | | | |
|---|---|---|---|
| 2,977,847 A | 4/1961 | Meyer-Arendt | |
| 3,437,395 A | 4/1969 | Rosenberger et al. | |
| 4,198,571 A | 4/1980 | Sheppard | |
| 4,629,324 A | 12/1986 | Stern | |
| 4,692,051 A | 9/1987 | Stansbury, Jr. et al. | |
| 4,852,985 A | 8/1989 | Fujihara et al. | |
| 4,995,716 A | 2/1991 | Warnicki et al. | |
| 5,022,743 A | 6/1991 | Kino | |
| 5,151,609 A | 9/1992 | Nakagawa | |
| 5,381,236 A | 1/1995 | Morgan | |
| 6,088,155 A | 7/2000 | Tandler et al. | |
| 6,275,335 B1 | 8/2001 | Costales | |
| 6,376,818 B1 | 4/2002 | Wilson et al. | |
| 6,616,291 B1 | 9/2003 | Love | |
| 7,729,049 B2 * | 6/2010 | Xu et al. .................... 359/383 |

(Continued)

OTHER PUBLICATIONS

Cole et al. "Time-domain whole-field fluorescence lifetime imaging with optical sectioning", Journal of Microscopy, vol. 203, Pt. 3, Sep. 2001, pp. 246-257.

*Primary Examiner* — Lee Fineman
(74) *Attorney, Agent, or Firm* — Bever, Hoffman & Harms, LLP; Jeanette S. Harms

(57) ABSTRACT

A 3-D optical microscope, a method of turning a conventional optical microscope into a 3-D optical microscope, and a method of creating a 3-D image on an optical microscope are described. The 3-D optical microscope includes a processor, at least one objective lens, an optical sensor capable of acquiring an image of a sample, a mechanism for adjusting focus position of the sample relative to the objective lens, and a mechanism for illuminating the sample and for projecting a pattern onto and removing the pattern from the focal plane of the objective lens. The 3-D image creation method includes taking two sets of images, one with and another without the presence of the projected pattern, and using a software algorithm to analyze the two image sets to generating a 3-D image of the sample. The 3-D image creation method enables reliable and accurate 3-D imaging on almost any sample regardless of its image contrast.

12 Claims, 18 Drawing Sheets

U.S. PATENT DOCUMENTS

| | | |
|---|---|---|
| 2004/0257360 A1 | 12/2004 | Sieckmann |
| 2006/0007533 A1 | 1/2006 | Eichhorn et al. |
| 2006/0038144 A1 | 2/2006 | Maddison |
| 2007/0109633 A1 | 5/2007 | Stelzer |
| 2007/0171519 A1 | 7/2007 | Wolleschensky |
| 2010/0134595 A1* | 6/2010 | Xu et al. ................. 348/46 |

* cited by examiner

3-D OPTICAL MICROSCOPE

RELATED APPLICATIONS

This application is a divisional of U.S. patent application Ser. No. 11/754,282, entitled "3-D Optical Microscope" filed May 26, 2007.

FIELD OF THE INVENTION

This invention relates generally to an optical microscope and, more particularly, to a three-dimensional (3-D) optical microscope, and a method of turning a conventional optical microscope into a 3-D optical microscope.

BACKGROUND OF THE INVENTION

A conventional microscope enables an operator to view magnified images of minute features on a sample otherwise invisible to the human eye. Because of this, conventional microscopes have been widely used in universities, in research institutes, and in many industries. A conventional microscope, however, has important limitations. For example, it only provides a two-dimensional (2-D) image of a sample while in the real world a majority of samples are 3-D in nature.

Various improvements have been made over the years to achieve 3-D viewing and 3-D imaging with optical microscopes. Costales in U.S. Pat. No. 6,275,335 discloses a stereomicroscope using various polarizing optical components to achieve a stereoscopic effect in the image. Although Costales' microscope produces a perception of depth, it cannot provide quantitative measurement of the depth dimension.

Kino in U.S. Pat. No. 5,022,743 proposes a confocal microscope utilizing a spinning Nipkow disc. Sheppard in U.S. Pat. No. 4,198,571 discloses a confocal microscope based on laser scanning. Although a confocal microscope is able to generate a 3-D image and provide quantitative depth measurement, it is expensive to build and relatively complex to maintain and operate. In addition, if one already bought a conventional microscope, it is not easy and in many cases impossible to turned his microscope into a confocal microscope.

Sieckmann in U.S. Appl. No. 2004/0257360A1 proposes a method of creating 3-D images of a sample by analyzing a stack of images of the sample taken at various focus positions. Although it is cost effective to implement such a method, it only works on samples with contrasting features. In short, Sieckmann's method fails to generate a reliable and accurate 3-D image of a sample with little or no contrast.

Morgan in U.S. Pat. No. 5,381,236 proposes an optical range sensor that is capable of sensing the depth profile of a plain surface by actively projecting a pattern of light onto the target object. Although Morgan's sensor measures the 3-D profile of a sample, it does not combine the 3-D profile with the intensity or color information of the sample. As a result, his sensor does not yield a 3-D image. In addition, the pattern of light in Morgan's sensor is always superimposed on the sample surface, and thus interferes with the true features of the sample surface being captured by a camera.

Accordingly, there is a need for a 3-D optical microscope that is relatively low cost to build and easy to operate; a method that can be easily deployed to turn a conventional microscope into a 3-D optical microscope; and a 3-D imaging method that works on all samples regardless of their feature contrast.

SUMMARY OF THE INVENTION

The need is met with the present invention which achieves three objectives: first, to create a simple and relatively low cost microscope that is capable of generating a 3-D image on samples with or without contrast; second, to propose simple hardware modifications that one can make to turn a conventional optical microscope into a 3-D optical microscope; and third, to disclose a method that enables reliable and accurate 3-D imaging on almost any sample regardless of its image contrast.

In a first aspect of the present invention, a 3-D optical microscope includes at least one objective lens to form an optical image of a sample; an optical sensor capable of acquiring said optical image; means for adjusting focus position of said sample relative to said objective lens; means for illuminating said sample, and for projecting a pattern onto and removing said pattern from the focal plane of said objective lens; and a processor connected to said microscope to control said optical sensor, said means for adjusting focus position, and said means for projecting and removing said pattern.

In a second aspect of the present invention, a conventional microscope is used as a base unit. Several modifications are performed on the base unit to turn it into a 3-D optical microscope. Said modifications comprise: (1) providing a pattern generator, the pattern generator configured for alternating between projecting a pattern onto and removing said pattern from the focal plane of an objective lens of said microscope, (2) providing a focusing adjustment device for automating objective lens focus adjustment at a plurality of Z steps, (3) providing an optical sensor capable of acquiring images at each Z step and (4) providing a processor for controlling the pattern generator, the focusing adjustment device, and the optical sensor, the processor configured to capture first and second images at each Z step, the first image with the pattern and the second image without the pattern.

In a third aspect of the present invention, a method of creating a 3-D image with a 3-D optical microscope of the present invention is disclosed. The method comprises: (a) projecting a pattern onto the focal plane of an objective lens of said optical microscope. (b) Varying the relative distance between a sample and said objective lens at pre-determined steps, and capturing a first set of images of said sample at each step, and recording said relative distance at each step. (c) Removing said pattern from the focal plane of said objective lens, resetting image sensor parameters, retracing the same steps taken in (b), and capturing a second set of images of said sample at each step. (d) Using a software algorithm to analyze the first and the second set of images to create a 3-D image of said sample.

Finally, in a fourth aspect of the present invention, a method of creating a 3-D image with a 3-D optical microscope of the present invention is disclosed. The method comprises: (1) varying the relative distance between a sample and an objective lens of said microscope at pre-determined steps. (2) At each step, projecting a pattern created by an electronic pattern generator onto the focal plane of said objective lens and capturing a first image of said sample; removing said pattern from the focal plane of said objective lens and capturing a second image of said sample; storing said first image into a first image array and said second image into a second image array. (3) Using a software algorithm to analyze the first and the second image array to create a 3-D image of said sample.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1A:
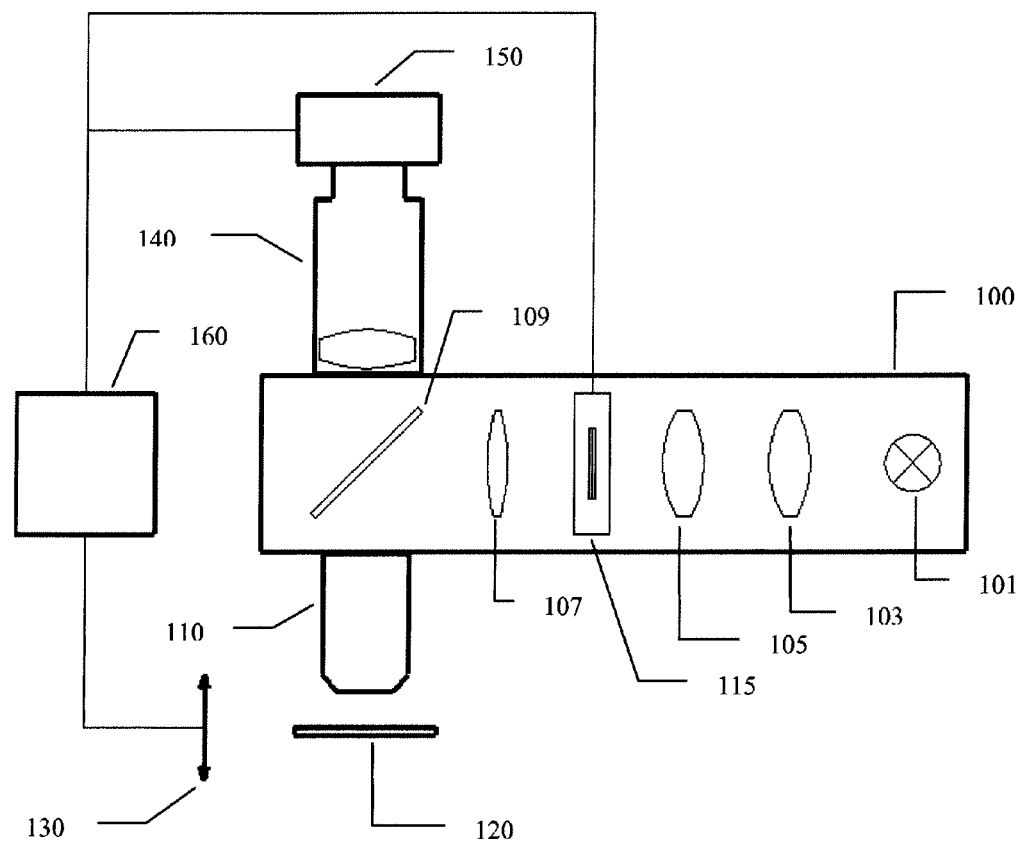
FIG. 1A is a block diagram illustrating a 3-D optical microscope with a reflective illuminator in accordance with a first embodiment of the present invention.

FIG. 1A is a diagram illustrating a 3-D optical microscope with a reflective illuminator in accordance with a first embodiment of the present invention. A microscope operating in reflective illumination mode is often used for studying opaque samples such as a semiconductor wafer. Reflective illuminator 100 provides illumination for the microscope and contains several components. Light source 101 generates illuminating light. Among possible choices for the light source are: a lamp, a fiber coupled light, a LED light, a laser, and etc. In the preferred embodiment, either a halogen lamp or a fiber coupled light source is used. Lenses 103, 105, and 107 ensure uniform illumination on sample 120 and, when pattern generator 115 is placed in the illuminator optical path, project an image of a patterned article to the focal plane of objective lens 110. Beam-splitter 109 is mounted at a 45° angle with respect to a centerline connecting lenses 103, 105, and 107 so that light from the light source is directed vertically downward to objective lens 110. Positioning means 130 is provided to change the relative position between sample 120 and objective lens 110. As a result, different features on the sample can be brought into focus of objective lens 110. As an option, a XY stage (not shown) can be incorporated into the microscope of FIG. 1A to move sample 120 around in a horizontal plane. In the preferred embodiment, positioning means 130 is a motorized Z stage. There are, of course, other ways to vary the relative position between sample 120 and objective lens 110. For example, objective lens 110 could be mounted on a piezoelectric actuator. In such an arrangement, sample 120 remains stationary while objective lens 110 moves up and down. It is understood by those skilled in the art that these variations are within the scope of this invention. Coupler 140 in conjunction with objective lens 110 yields an image of sample 120 on optical sensor 150. In the preferred embodiment, optical sensor 150 is either a CCD or a CMOS camera.

Figure 1B:
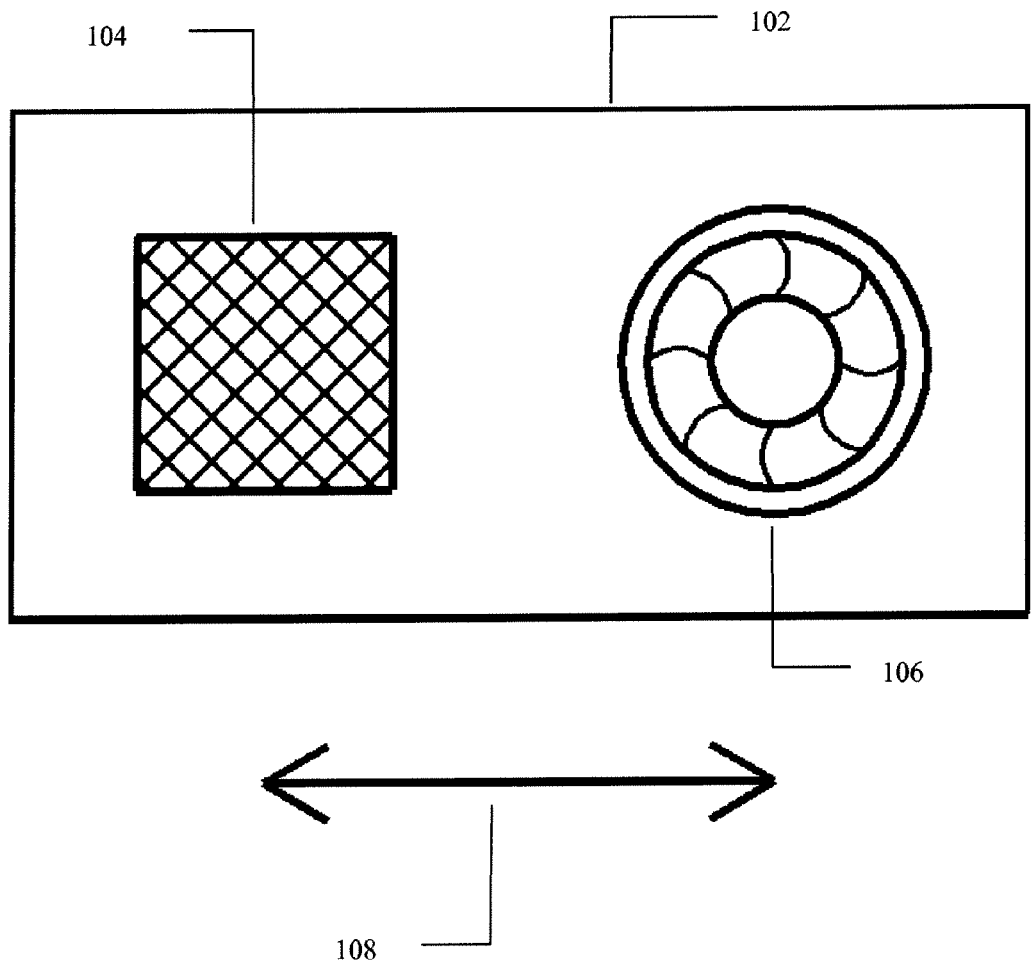
FIG. 1B is a diagram illustrating a mechanical pattern generator.

Pattern generator 115 can either be a mechanical one or an electronic one. An example of an electronic pattern generator is a liquid crystal pattern generator. One possible implementation of a mechanical pattern generator is shown in FIG. 1B. It contains several components. Patterned article 104 has a pre-determined pattern shown in FIG. 1B as a grid. Other patterns will also work as long as they satisfy the following conditions: (1) they have high contrast; (2) they are either regular or random but evenly distributed; (3) they are semi-transparent; (4) their minimum feature size matches sampling resolution of an imaging optical sensor used. Patterned article 104 could be a piece of patterned photographic film or patterned glass. It is understood that various patterns can be created on various substrate materials to make patterned article 104, and that these variations are also within the scope of this invention.

Patterned article 104 is seated in hardware mount 102, so is a regular microscope field-stop diaphragm 106. The field-stop diaphragm can either open up or close down to control the diameter of the illuminating light beam. When inserted into the illuminator optical path, the field-stop diaphragm can improve an image by reducing interference caused by out of field-of-view objects. Patterned article 104 and field-stop diaphragm 106 share the same hardware mount 102 for a reason. We mentioned earlier that an image of patterned article 104, when inserted in the optical path of illuminator 100, is formed at the focal plane of objective lens 110. A field-stop by definition must be placed at a location within a microscope illuminator where an image of the field-stop is formed at the focal plane of an objective lens. This unique location within a microscope illuminator is called the field-conjugate plane. By attaching patterned article 104 and field-stop diaphragm 106 on the same hardware mount 102, and by sliding mount 102 perpendicular to the optical path of illuminator 100, we make sure that both the patterned article and the field-stop diaphragm stays at the field-conjugate plane when they are inserted in the illuminator optical path. Mount 102 is controlled by positioning means 108 so that patterned article 104 and field-stop 106 can be inserted into and taken out of the illuminator optical path when needed. In the preferred embodiment, positioning means 108 is a motorized actuator. Other positioning means such as a solenoid actuator will work as well. By mechanically sliding hardware mount 102, we can either insert patterned article 104 into the illuminator optical path, thus projecting an image of patterned article 104 onto the focal plane of the objective lens; or we can remove patterned article 104 from the illuminator optical path, thus removing the image of patterned article 104 from the focal plane of the objective lens. Since insertion and removal of the image of the patterned article is done mechanically, we call such a device a mechanical pattern generator.

If pattern generator 115 is an electronic one such as a liquid crystal pattern generator (or LCPG), one can just place the LCPG in the illuminator optical path. The LCPG is capable of creating a desired pattern similar to that of patterned article 104. In addition, the LCPG can generate images that mimic the opening up and closing down of the diaphragm of field-stop 106. In short, the LCPG can replace the functionality of the entire assembly of FIG. 1B. Since creation and removal of a pattern on the LCPG is done electronically, there is no need to physically slide the LCPG in and out. Thus, we call a device like the LCPG an electronic pattern generator.

There are alternative ways to design reflective illuminator 100. For example, one can use a light source and less than three lenses to project an image of a patterned article onto the focal plane of an objective lens. One can also use a light source and more than three lenses to create multiple field-conjugate planes where he can place a patterned article and have its image projected onto the focal plane of an objective lens. It is understood that these alternative illuminator designs are also within the scope of the present invention.

Processor 160 is connected to the 3-D optical microscope of FIG. 1A. Said processor is used to control positioning means 130, pattern generator 115, and optical sensor 150. In addition, said processor analyzes data and creates a 3-D image of the sample. In the preferred embodiment, said process is a personal computer.

Creating a 3-D image on the 3-D optical microscope of FIG. 1A with a mechanical pattern generator shown in FIG. 1B involves two separate passes according to the present invention. In the first pass, patterned article 104 is inserted into the optical path of illuminator 100. Positioning means 130 moves sample 120 from a pre-determined start position away from objective lens 110 through a set of pre-determined steps. At each step, optical sensor 150 captures and saves the image of the sample. In the second pass, patterned article 104 is removed from the optical path of illuminator 100. Positioning means 130 moves sample 120 to the same start position and subsequently through the same steps as defined in the first pass. At each step, optical sensor 150 captures and saves the image of the sample. When done, processor 160 analyzes the first and second pass data set to create a 3-D image. The details of the two-pass 3-D image creation process of the present invention will be discussed in depth when we describe FIGS. 5A and 5C later.

Creating a 3-D image on the 3-D optical microscope of FIG. 1A with an electronic pattern generator such as a LCPG involves just a single pass according to the present invention. During the process, positioning means 130 moves sample 120 from a pre-determined start position away from objective lens 110 through a set of pre-determined steps. At each step, a pattern created by the LCPG is projected onto the focal plane of objective lens 110, optical sensor 150 captures and saves a first image of the sample; then the LCPG quickly erases that pattern, optical sensor 150 captures and saves a second image of the sample. This process repeats itself until all the steps have been taken. When done, processor 160 analyzes the first and second image set to create a 3-D image. The details of the single pass 3-D image creation process of the present invention will be discussed when we describe FIGS. 5B and 5C later. It is understood that the single pass 3-D image creation process can also be applied to the 3-D optical microscope of FIG. 1A with a mechanical pattern generator as long as insertion and removal of the patterned article is sufficiently fast. In the next several paragraphs, we will discuss software controls and algorithms related to acquiring 2-D image stacks of a sample, extracting image contrast, constructing 3-D depth profiles, and creating a 3-D rendering of the sample.

A microscope objective lens is usually characterized by several important parameters such as focal length, magnification, working distance (W.D.), and numerical aperture (N.A.). To a large extent, the N.A. of an objective lens determines its depth-of-field. When a sample is placed at the focal plane of an objective lens, the sample is said to be in-focus, and the image produced by the objective lens has the sharpest contrast. If the same sample is placed slightly away from the focal plane but is still within the range defined by the depth-of-field, the image contrast is still relatively sharp. As the sample is moved out of the depth-of-field range, it becomes out-of-focus, and the image becomes blurrier.

Mathematically, image contrast is related to the high frequency or gradient content of the image intensity: the sharper the image, the higher the intensity gradient, and the stronger its high frequency content. Consider a microscope operator who is trying to find the best focus. He will move the sample up and down around the focal plane of the objective lens to find the point where the image contrast is the highest. Similarly, a system can be devised so that the relative position between the sample and the objective lens is changed at controlled steps. After each step move, a camera takes an image; the image is converted into digital form so a computer can extract its high frequency content. This high frequency content is recorded and compared with that of the previous steps. As the sample is stepping one-way towards and eventually passing through the best focus, its image's high frequency content level would rise, reach a peak, and then fall. The best focus position corresponds to where the image's high frequency content reaches a maximum.

Generally, an object is not flat but rather has a depth profile. By calculating the high frequency contents at each pixel for every image taken at a specific distance between the sample and the objective lens, the computer can compare and find the distance where maximum high frequency content of each pixel occurs. By applying this calculation to all pixels, the process can, in theory, yield a depth profile of the sample. The intensity or color values of those pixels that are located on the contour of the depth profile can also be extracted from the relevant images. Graphic rendering of both depth and color information should yield a 3-D image of the sample. This type of image contrast based 3-D creation method forms the basis of Sieckmann in U.S. Appl. No. 2004/0257360A1.

There are many well-known methods in calculating the high frequency content of a pixel. Most of these methods are based on finding the intensity differences among neighboring pixels, and are called high pass filters, or gradient filters. Most commonly, the operation of these filters is a convolution of a filter mask with the pixel and its immediate 8 neighboring pixels:

| Filtermask, Laplacian | | | Neighboring pixels | | |
|---|---|---|---|---|---|
| −1 | −1 | −1 | P(−1,−1) | P(0,−1) | P(1,−1) |
| −1 | 8 | −1 | P(−1,0) | P(0,0) | P(1,0) |
| −1 | −1 | −1 | P(−1,1) | P(0,1) | P(1,1) |

Where P(i,j) is the intensity of a pixel located (i,j) pixels away from the reference pixel or pixel of interest, and i being the relative pixel number in the horizontal (X) direction, and j being that in the vertical (Y) direction. For example, if P(0, 0) is the intensity of the pixel of interest, then P(−1,−1) refers to that of its top left neighboring pixel, P(0,−1) that of its top neighbor, and P(1,−1) that of its top right neighbor. Using the Laplacian high pass filter to find the high frequency content of P(0, 0) involves convolving the Laplacian filter mask with the neighboring pixels:

$$\text{High frequency content of } P(0,0) = \text{absolute}(8*P(0,0) - 1*P(-1,-1) - 1*P(0,-1) - 1*P(1,-1) - 1*P(-1,0) - 1*P(1,0) - 1*P(-1,1) - 1*P(0,1) - 1*P(1,1)) \quad \text{Equation 1}$$

A high pass filter, like the Laplacian, is non-directional in that it does not care whether or not an image has directional features. There are directional high pass or edge filters that have filter masks optimized to the direction of interest. For example, if an image is known to have horizontal edges or lines, and if only the vertical component of the high frequency content is wanted, then the North-South edge filter mask can be used to produce a much stronger result than one can get by using a non-directional filter mask.

| North-South directional filter mask: | | |
| --- | --- | --- |
| −1 | −1 | −1 |
| −0 | 0 | 0 |
| 1 | 1 | 1 |

Since most images do not have a fixed feature orientation, a single directional filter operation will in general not yield desirable results. Instead, multiply applications of directional filters such as the ones shown below, each with a different direction, are performed to find the gradients along these directions. Among them, the one filter that yields maximum value determines the maximum high frequency content of a pixel. Such an approach is called maximum gradient method.

| North-South mask: | | | East-West mask: | | | 135 deg mask: | | | 45 deg mask: | | |
| --- | --- | --- | --- | --- | --- | --- | --- | --- | --- | --- | --- |
| −1 | −1 | −1 | 1 | 0 | −1 | −1 | −1 | 0 | 0 | −1 | −1 |
| 0 | 0 | 0 | 1 | 0 | −1 | −1 | 0 | 1 | 1 | 0 | −1 |
| 1 | 1 | 1 | 1 | 0 | −1 | 0 | 1 | 1 | 1 | 1 | 0 |

A three-by-three filter mask is commonly used because of its small size, thus computational efficient, and because it captures only the highest frequency content. Other directional 3×3 edge filter masks are also possible. For example, the Sobel edge filter mask, shown below, will yield similar results.

| Sobel North-South mask: | | |
| --- | --- | --- |
| 1 | 2 | 1 |
| 0 | 0 | 0 |
| −1 | −2 | −1 |

A larger filter mask, 5×5 or 7×7 for example, also works. In particular, a larger filter mask can be tailored to work better for images with lower contrast, or with more lower frequency contents, at the expense of computation efficiency. It is understood that other filter masks that can be used to extract contrast information is within the scope of the present invention.

Figure 2:
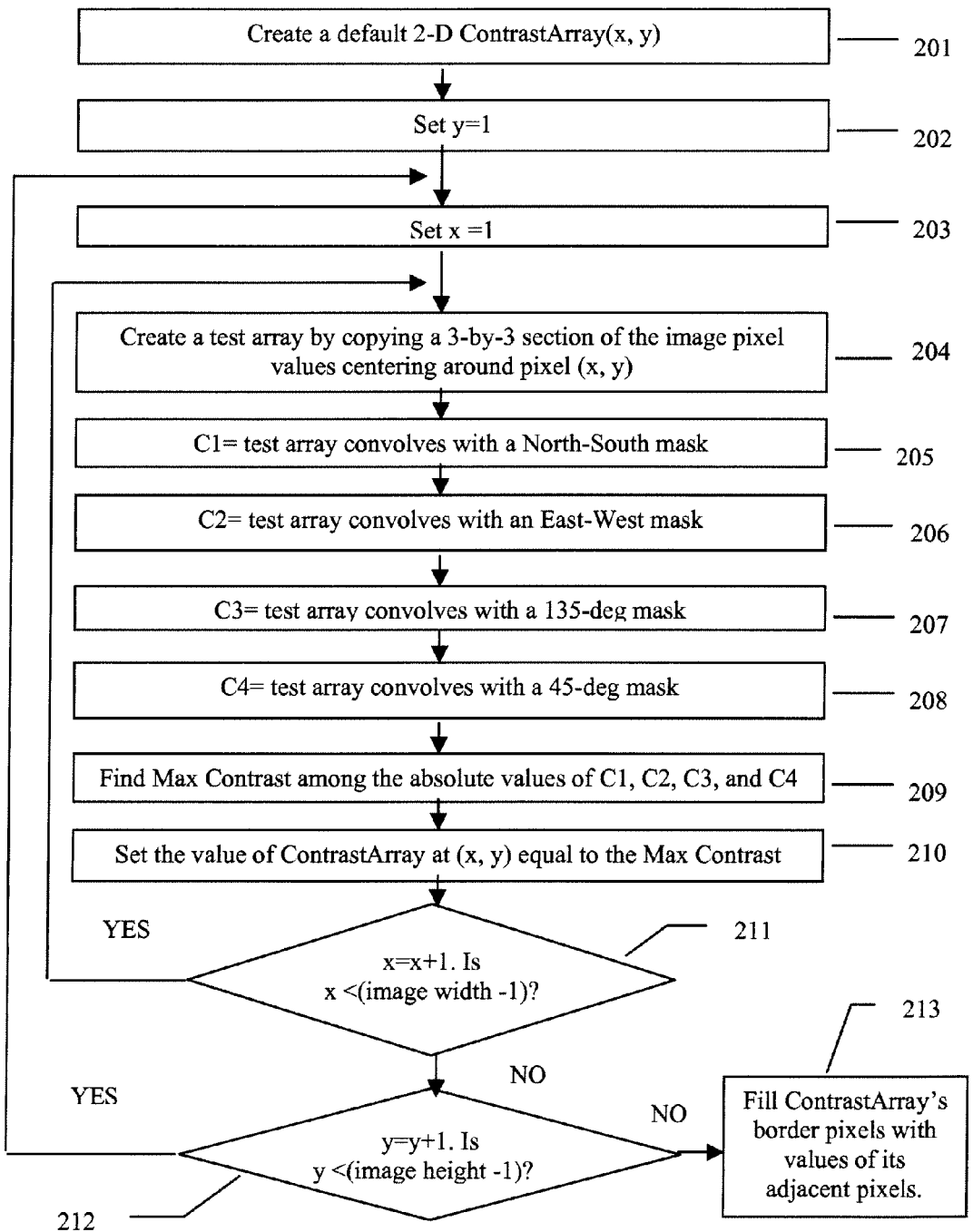
FIG. 2 is a flowchart illustrating a process of extracting a 2-D contrast array from a 2-D image using maximum gradient method.

A process of extracting a 2-D contrast array from a 2-D image based on maximum gradient method is illustrated in FIG. 2. In step 201, a default 2-D ContrastArray(x, y) is created, where all pixel are either left un-initialized or set to a default value. In steps 202 and 203, the initial pixel location is set to (x=1, y=1). In step 204, a test array is created by copying the intensity values of a 3-by-3 section of the image pixels centering around pixel (1, 1). Convolving this test array with a North-South mask in a manner similar to Equation 1 yields a value C1 in step 205. Subsequently, convolving the same test array with an East-West, 135-deg, and 45-deg masks yield values C2, C3, and C4 respectively in steps 206-208. In step 209, a comparison is made among C1, C2, C3, and C4 to find the maximum absolute value. In step 210, the maximum contrast for pixel (1, 1), ContrastArray(1, 1), is set to equal to the maximum value found in step 209. Next, we move one pixel over in the horizontal direction, that is, our next pixel is (2, 1). Since x=2, x is less than (image width−1), test 211 returns YES and the process flow is looped back to 204. This loop will run its course until x≧(image width−1). At that point, the flow proceeds to step 212 where we start to increment y pixel number from 1 to 2, and the process is moved back to step 203, and x is set to 1. Again the loop will run its course until y≧(image height−1) and test 212 returns NO. At that moment we have filled in the entire ContrastArray(x, y) except for the border pixels. We simply fill ContrastArray corresponding to the border pixels with the values of their adjacent pixels in step 213. We now have finished generating a 2-D contrast array from a 2-D image.

Figure 3:
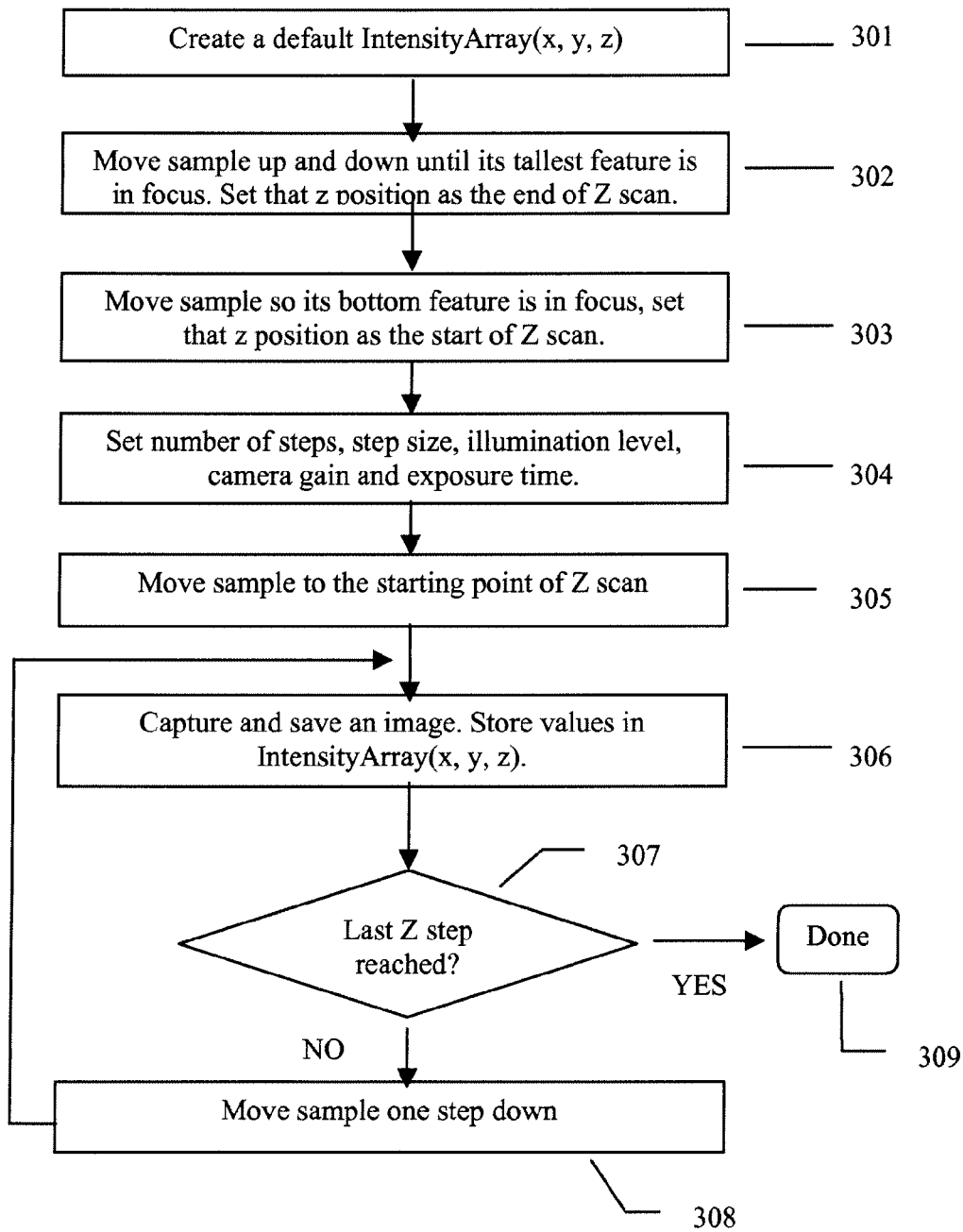
FIG. 3 is a flowchart illustrating a process of performing a Z scan and image capture.

To create a 3-D depth profile of a sample based on contrast analysis method, a stack of images must be taken at different focus positions or relative sample-objective lens z distances. The detailed image capturing process is illustrated in FIG. 3. The process starts with step 301, the creation of a default IntensityArray(x, y, z) where all pixels are either left un-initialized or set to a default value. At this point, a user must determine the range of z distances in order to cover the tallest peak and the deepest valley on the sample. This is done in steps 302 and 303. In step 304, the user also needs to specify the number of steps, so the computer can calculate the Z step size needed to cover the entire z distance range. Alternatively, he can specify step size, and the computer determines the number of steps to cover the z range. The user must also choose the right amount of illumination and select appropriate gain and exposure time for the camera so that an image captured by the camera is neither too bright nor too dark. Of course, once all of these settings are fine tuned, they can be stored in a recipe to be used later by the computer on similar samples. After choosing all the settings, the sample is moved to the starting Z scan position in step 305. In step 306, the camera captures an image in digital form. The intensity values of every pixel of the image and the corresponding z distance value is stored into IntensityArray(x, y, z). At that point, the flow proceeds to check point 307 to see if the last Z scan step is reached. If not, the sample is moved down one step, at 308, and the process is directed back to step 306. This loop will run its course until the last Z scan step is reached. The process of FIG. 3 is called Z scan and image capture.

Since the working distance of a high magnification objective lens is usually very small, some precaution is needed to prevent the objective lens from coming into contact with the sample during the Z scan. Generally speaking, it is safer to start the Z scan from a position where the sample is closest to the objective lens within the Z scan range, and gradually move the sample away from the objective lens. In the case of FIG. 3, this means to start the scan from the bottom of the sample, and move the sample down to cover the full Z scan range. As mentioned earlier, there are alternative ways to carry out the Z scan other than moving the sample. For example, it is possible to move the objective lens up and down to achieve the same result as stepping the sample. If the approach is moving the objective lens, it is safer to start the Z scan from the bottom of the sample, and then gradually step the objective lens upward to cover the full Z scan range.

Figure 4:
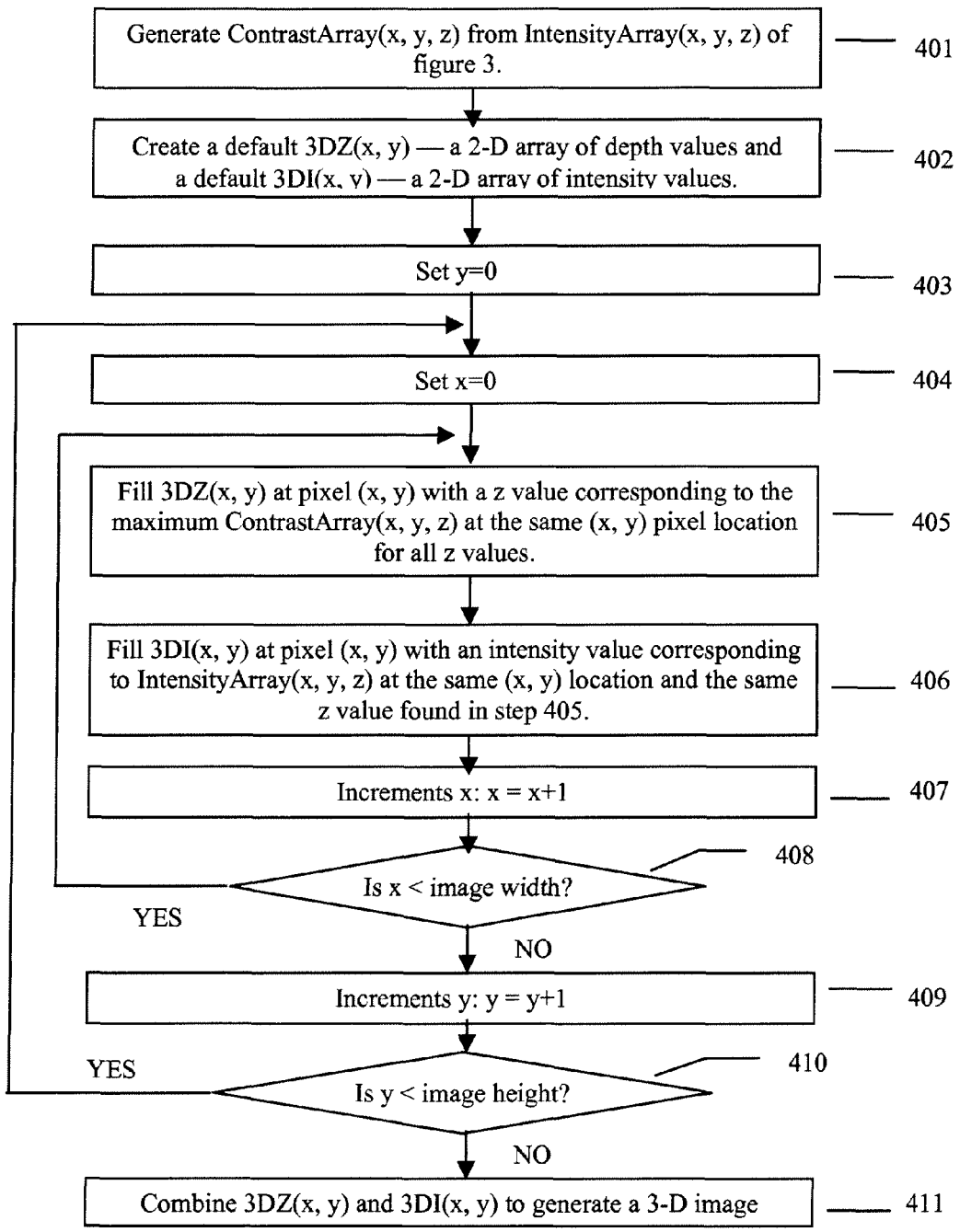
FIG. 4 is a flowchart illustrating a process of generating a 3-D image based on image contrast.

Once a stack of images is captured through the Z scan process of FIG. 3, a 3-D image of the sample can be constructed using a process outlined in FIG. 4. The process starts with step 401, the creation of a high contrast array ContrastArray(x, y, z). For every z step, the corresponding values of ContrastArray(x, y, z) is calculated based on the maximum gradient method of FIG. 2 using the image data stored in IntensityArray(x, y, z) of FIG. 3. The next step, 402, is to create a default array 3DZ(x, y) to store depth value and a default array 3DI(x, y) to store intensity value. In steps 403 and 404, the pixel location (x, y) is initially set at x=0 and y=0. For this initial pixel (0, 0), a search is carried out to find the maximum value among array elements ContrastArray(0, 0, z). The z value corresponding to this maximum is defined as $Z_{max}$ and is then stored as array element 3DZ(0, 0) in step 405. The intensity value corresponding to IntensityArray(0, 0, $Z_{max}$) is stored as array element 3DI(0, 0) in step 406. It is now time to move to the next pixel x=1 and y=0, or pixel (1, 0) in step 407. Test 408 is carried out to see if x is less than the image width. A positive answer will direct the flow back to steps 405 through 408. This loop will run its course until test 408 yields a negative answer. At that point 409, the y pixel number is incremented by 1. Test 410 is carried out to see if y is less than the image height. A positive answer will direct the flow back to steps 404 through 410. This loop will run its course until test 410 yields a negative answer. At that moment, array 3DZ(x, y) and array 3DI(x, y) are filled. The final step 411 involves taking the z value of 3DZ(x, y) and image intensity value 3DI(x, y) at every pixel location (x, y) and rendering them as a 3-D image.

Figure 5A:
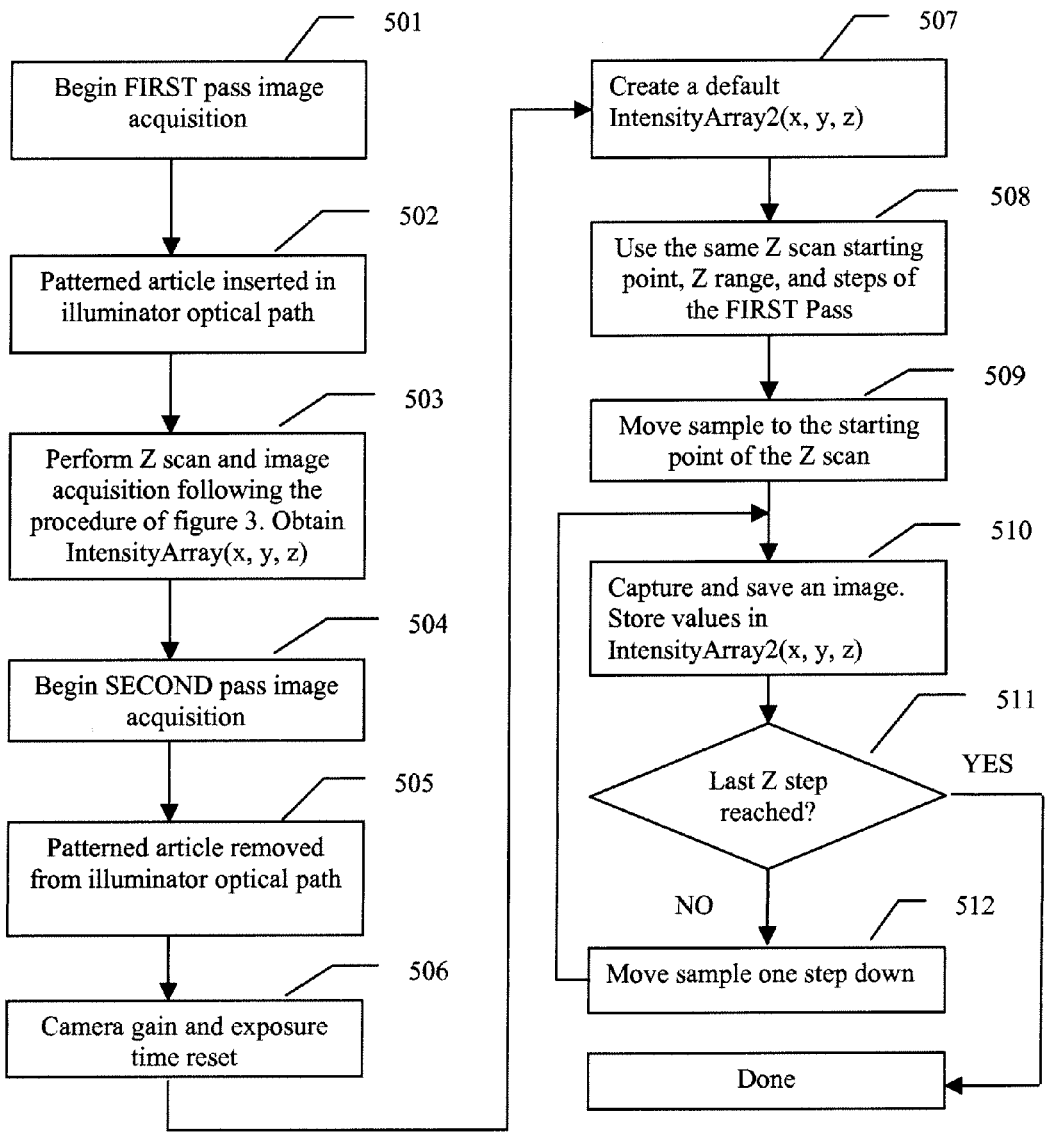
FIG. 5A is a flowchart illustrating a two-pass Z scan and image acquisition process associated with a mechanical pattern generator of the present invention.
Figure 5B:
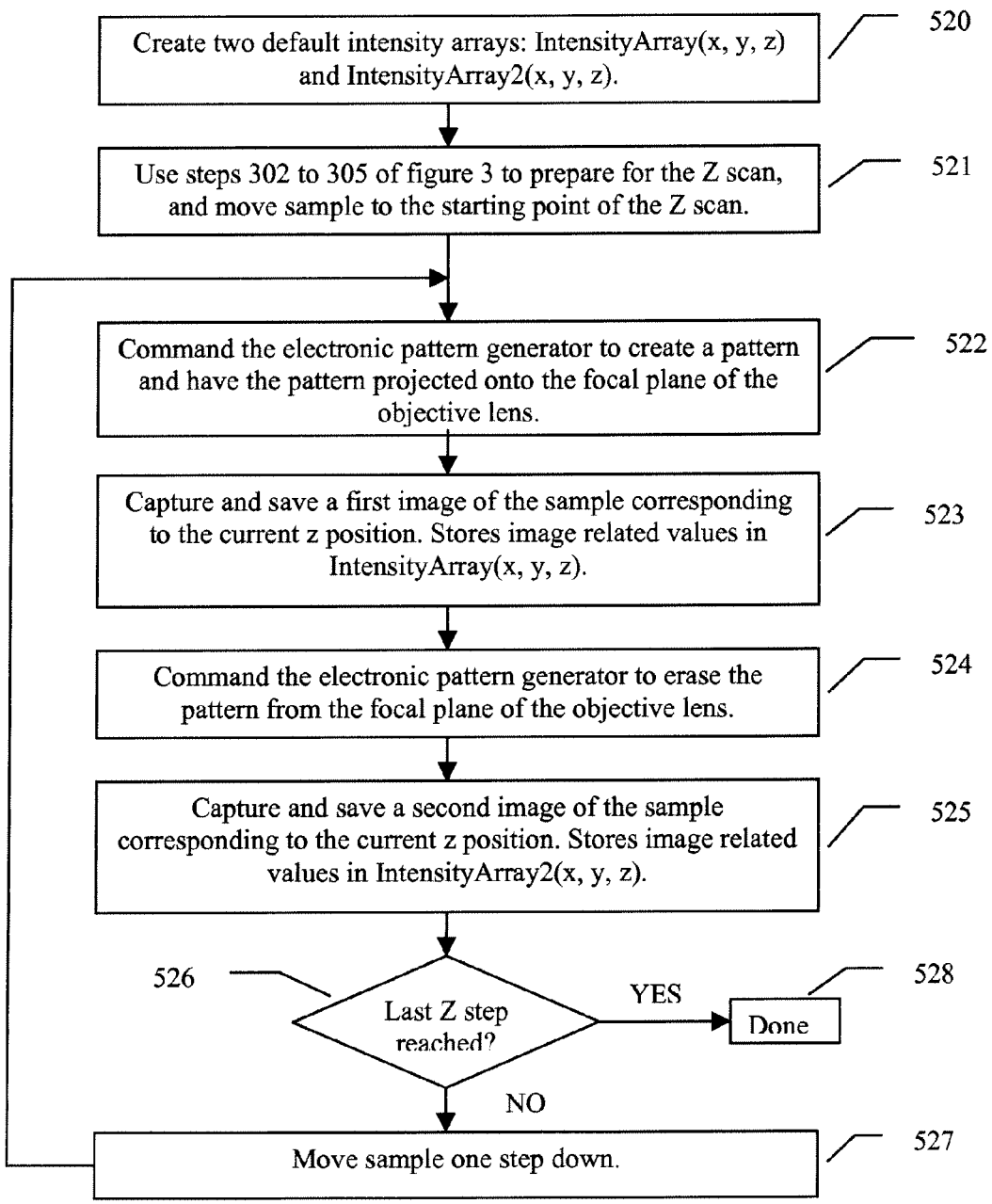
FIG. 5B is a flowchart illustrating a single pass Z scan and image acquisition process associated with an electronic pattern generator of the present invention.
Figure 5C:
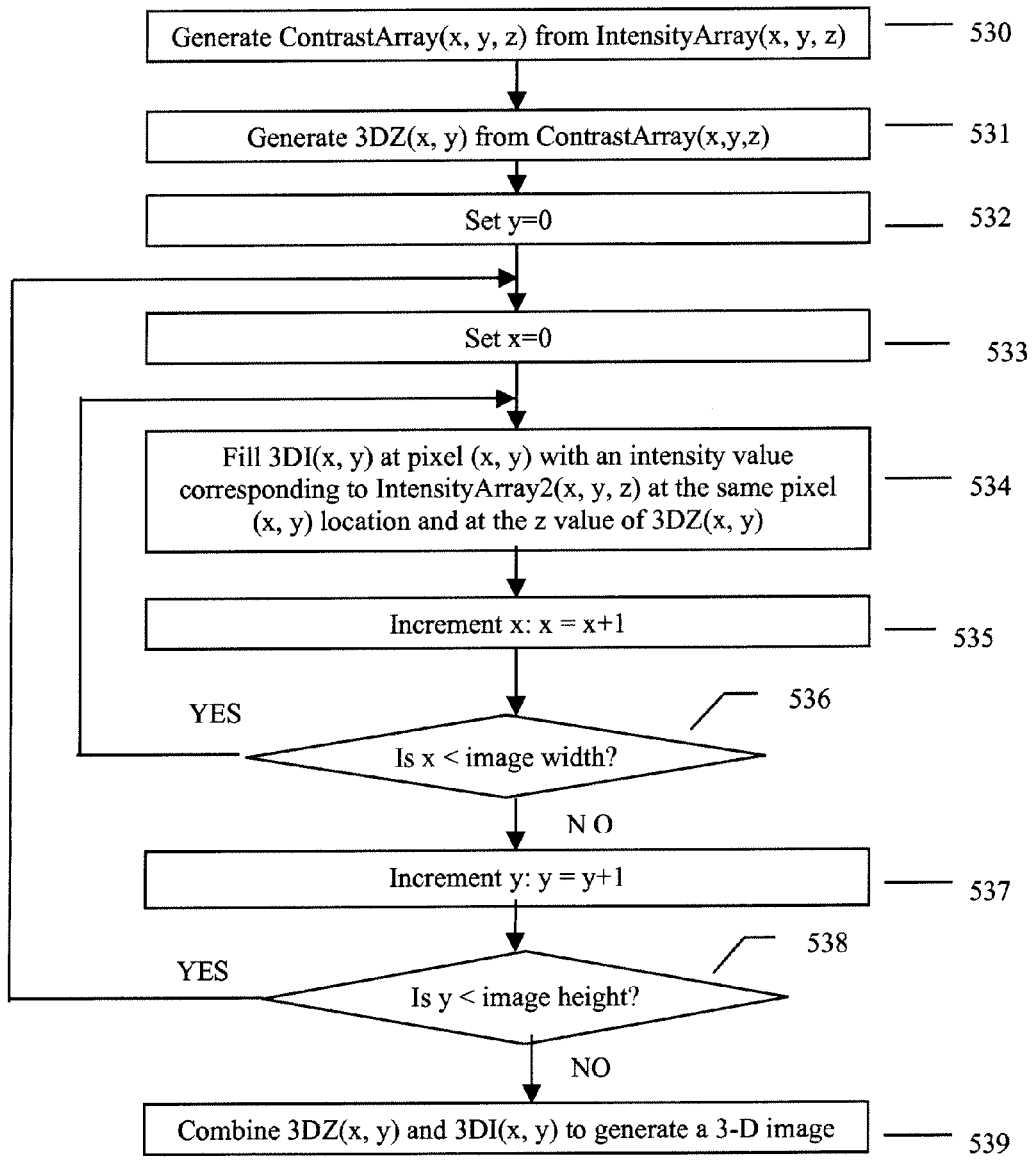
FIG. 5C is a flowchart illustrating a data analysis process to generate a 3-D image in accordance with the present invention.

While contrast based 3-D image creation method, as described during the discussion of FIGS. 2 through 4, works for samples with a surface texture that produces high image contrast when in focus, it has difficulties with smooth samples with little contrast. Such an important limitation is unfortunately associated with Sieckmann in U.S. Appl. No. 2004/0257360A1. An improved 3-D image generation method of the present invention that overcomes this difficulty will now be described. Our method involves a two-pass image acquisition process if a mechanical pattern generator is used or a one-pass image acquisition process if an electronic pattern generator is used, and subsequent data analysis. FIG. 5A outlines a two-pass image acquisition process of the present invention with a mechanical pattern generator. FIG. 5B outlines a one-pass image acquisition process of the present invention with an electronic pattern generator. FIG. 5C illustrates a data analysis process to construct a 3-D image in according with the present invention.

In a two-pass image acquisition process of the present invention associated with a mechanical pattern generator, the first pass begins at step 501 of FIG. 5A. Patterned article 104 is inserted in the optical path of illuminator 100 at the field-conjugate plane location in step 502. For a flat sample with no contrast such as a polished clean bare silicon wafer surface, it is normally a challenge to know when the surface is in focus. With patterned article 104 inserted, however, the task becomes trivial. Whenever the pattern of patterned article 104 is in focus, we know that the flat sample is also in focus, and vice versa. For a sample with topography or depth profile, whenever a certain part of it, say region A, is in focus, the corresponding part of the pattern of patterned article 104 which overlaps with region A in the image field-of-view will also be in focus. In step 503, the Z scan process of FIG. 3, namely steps 301 through 309, is carried out to complete the remaining tasks of the first image acquisition pass. At that point, IntensityArray(x, y, z) is filled with image data from the first pass.

During the second image acquisition pass which begins at step 504, patterned article 104 is removed from the optical path of illuminator 100 in step 505. In step 506, gain and exposure time of the camera are reset. This is necessary because the brightness of an image is quite different between with and without the presence of patterned article 104. Because of such a difference, a means for changing the image intensity for the second pass has to be implemented. There are several ways to compensate for the intensity difference:

1. Using a Neutral Density Attenuator
    Instead of inserting a patterned article for the first pass and removing the patterned article for the second pass, a neutral density filter is inserted during the second pass. The requirement for the neutral density attenuator is such that when inserted, the amount of average image intensity change matches that caused by inserting a patterned article.
2. Using Different Camera Settings
    This approach calls for storing the image intensity prior to the insertion of a patterned article. During the second pass when the patterned article is removed, the gain and exposure time of the camera is reset so that the image intensity matches that of the stored intensity.
3. Adjusting Light Source Intensity
    This approach requires saving the image intensity prior to the insertion of a patterned article. During the second pass when the patterned article is removed, the light source intensity is adjusted so that the image intensity matches that of the stored intensity.

Since gain and exposure control are provided on most cameras, the second approach above is the preferred embodiment of the present invention to compensate for intensity difference between with and without the presence of patterned article 104. In step 507, a default IntensityArray2(x, y, z) is created. In step 508, the Z scan starting point, the number of Z steps, and the step size of the second pass are set identical to that of the first pass. In step 509, the sample is moved to the starting Z scan position. In step 510, the camera captures an image in digital form, and the intensity or color values of every pixel of the image and the corresponding z distance value is stored into IntensityArray2(x, y, z). At that point, the flow proceeds to check point 511 to see if the last Z scan step is reached. If not, the sample is moved down one step, in 512, and the process is directed back to step 510. This loop will run its course until the last Z scan step is reached. At that point, IntensityArray2(x, y, z) is filled with image data from the second pass.

In a one-pass image acquisition process of the present invention associated with an electronic pattern generator, the process begins at step 520 of FIG. 5B with the creation of two default arrays IntensityArray(x, y, z) and IntensityArray2(x, y, z). In step 521, preparation for the Z scan is carried out by following the steps of 302 through 305 in FIG. 3, and the sample is moved to the starting position of the Z scan. If the sample has little or no contrast, the electronic pattern generator can temporarily create a pattern and have it projected onto the focal plane of the objective lens to help the search for the top and bottom of the Z scan range. In step 522, the electronic pattern generator creates a pattern and an image of the pattern is projected onto the focal plane of the objective lens. In step 523, a first image of the sample at the current z position is captured and saved in IntensityArray(x,y,z). This image contains information from both the sample and the pattern generated by the electronic pattern generator. In step 524, the electronic pattern generator erases the pattern. As a result, the focal plane of the objective lens now only contains information of the sample. In the mean time, the electronic pattern generator also adjusts the intensity scale automatically so that the average image intensity with or without the pattern's presence is the same. In step 525, a second image of the sample is captured and saved in IntensityArray2(*x*, *y*, *z*). In step 526, a test is carried out to see if the last Z scan step is reached. If not, the sample is moved down one step, in 527, and the process is directed back to step 522. This loop will run its course until the last Z scan step is reached. At that point, IntensityArray(x, y, z) is filled with image data from the first image set, and IntensityArray2(*x*, *y*, *z*) is filled with image data from the second image set.

FIG. 5C outlines a data analysis process involved in constructing a 3-D image according to the present invention. The process starts with 530, the creation of a high contrast array ContrastArray(x, y, z) from IntensityArray(x, y, z). Note that IntensityArray(x, y, z) and IntensityArray2(*x*, *y*, *z*) are fundamentally different; while the former is based on images containing information from both the sample and the patterned article, the latter is based on images containing information from the sample only. The next step, 531, is to generate a 3DZ(x, y) from ContrastArray(x, y, z) according the procedure of FIG. 4. In steps 532 and 533, the pixel location (x, y) is initially set at y=0 and x=0. For this initial pixel (0, 0), the value of 2-D array element 3DI(0, 0) is set equal to IntensityArray2(0, 0, z) in step 534, where z is the value of element 3DZ(0, 0). It is now time to move to the next pixel x=1 and y=0, or pixel (1, 0), in step 535. Test 536 is carried out to see if x is less than the image width. A positive answer will direct the flow back to steps 534 through 536. This loop will run its course until test 536 yields a negative answer. At that point 537, the y pixel number is incremented by 1. Test 538 is carried out to see if y is less than the image height. A positive answer will direct the flow back to steps 533 through 538. This loop will run its course until test 538 yields a negative answer. At that moment, array 3DI(x, y) are filled with image information from IntensityArray2(*x*, *y*, *z*). The final step 539 involves taking the z values of 3DZ(x, y) and image intensity or color values 3DI(x, y) at every pixel location (x, y) and rendering them as a 3-D image.

Those skilled in the art of computer programming and image processing will be familiar with techniques for improving the computational efficiency of the algorithm disclosed above. In particular, the use of parallel programming to speed up the process of image capturing, processing, and storage is within the scope of this invention.

It is worth pointing out that the z values of 3DZ(x, y) are based entirely on IntensityArray(x, y, z) while the image intensity or color values of 3DI(x, y) is generated with data only from IntensityArray2(x, y, z). In essence, for the two-pass image acquisition process associated with a mechanical pattern generator, we are using the first pass data to find a 3-D depth profile or a 3-D skeleton of the sample, and then filling the skeleton with image intensity or color data from the second pass; for the one-pass image acquisition process associated with an electronic pattern generator, we are using the first image set to find a 3-D skeleton of the sample, and then filling the skeleton with image intensity or color data from the second image set. The most important difference between the 3-D creation method of the present invention and that of Sieckmann in U.S. Appl. No. 2004/0257360A1 lies in the fact that in generating a 3-D skeleton of a sample, we rely on the image contrast of a patterned article while Sieckmann relies on the image contrast of the sample itself. Therefore, the method of the present invention will work on samples with little or no image contrast while that of Sieckmann's won't.

Figure 6:
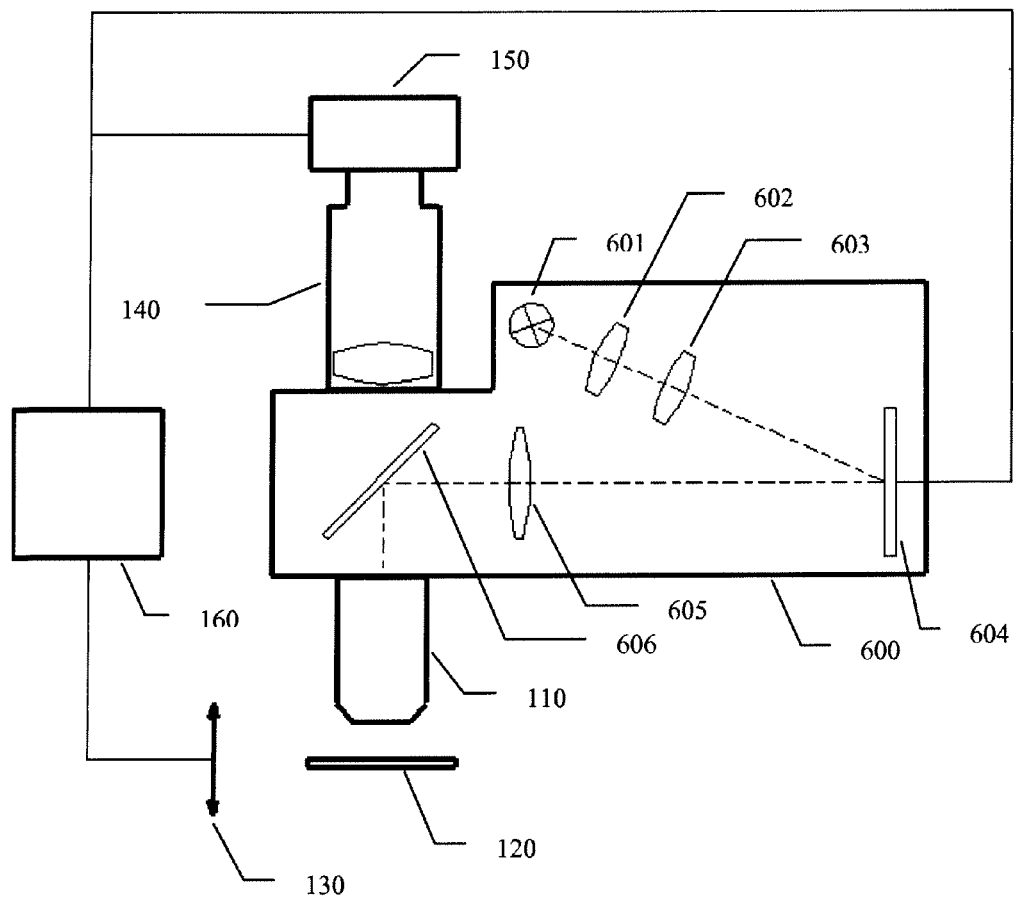
FIG. 6 is block diagram illustrating a 3-D optical microscope with a reflective illuminator in accordance with a second embodiment of the present invention.

FIG. 6 is a diagram illustrating a 3-D optical microscope with a reflective illuminator in accordance with a second embodiment of the present invention. The main difference between this embodiment and the first embodiment illustrated in FIG. 1A is in illuminator design. Illuminator 600 provides illumination for the microscope and contains several components, one of which is an electronic pattern generator 604 operating in reflective mode. One example of a reflective electronic pattern generator is a digital micro-mirror device (or DMD) made by Texas Instruments. A DMD contains a rectangular array of micro mirrors, each mounted on a tiny hinge that enables it to tilt either towards the light source (ON) or away from it (OFF). When every micro mirror is ON, the DMD effectively becomes a regular mirror. When some micro mirrors are ON while others are OFF, the DMD acts like a patterned article. Light source 601 generates illuminating light. Among possible choices for the light source are: a lamp, a fiber coupled light, a LED light, a laser, and etc. In the preferred embodiment, either a halogen lamp or a fiber coupled light source is used. Lenses 602, 603, and 605 ensure uniform illumination on sample 120 and, when electronic pattern generator 604 acts like a patterned article, project an image of the patterned article to the focal plane of objective lens 110. Beam-splitter 606 is mounted at a 45° angle with respect to a horizontal direction so that light from the light source is directed vertically downward to objective lens 110.

Positioning means 130 is provided to change the relative position between sample 120 and objective lens 110. As a result, different features on the sample can be brought into focus of objective lens 110. In the preferred embodiment, positioning means 130 is a motorized Z stage. As an option, a XY stage (not shown) can be incorporated into the microscope of FIG. 6 to move sample 120 around in a horizontal plane. There are, of course, other ways to vary the relative position between sample 120 and objective lens 110. For example, objective lens 110 could be mounted on a piezoelectric actuator. In such an arrangement, sample 120 remains stationary while objective lens 110 moves up and down. It is understood by those skilled in the art that these variations are within the scope of this invention. Coupler 140 in conjunction with objective lens 110 yields an image of sample 120 on optical sensor 150. In the preferred embodiment, optical sensor 150 is either a CCD or a CMOS camera. Processor 160 is connected to the 3-D optical microscope of FIG. 6. Said processor is used to control positioning means 130, electronic pattern generator 604, and optical sensor 150. In addition, said processor analyzes data and creates a 3-D image of the sample. In the preferred embodiment, said process is a personal computer.

Figure 7:
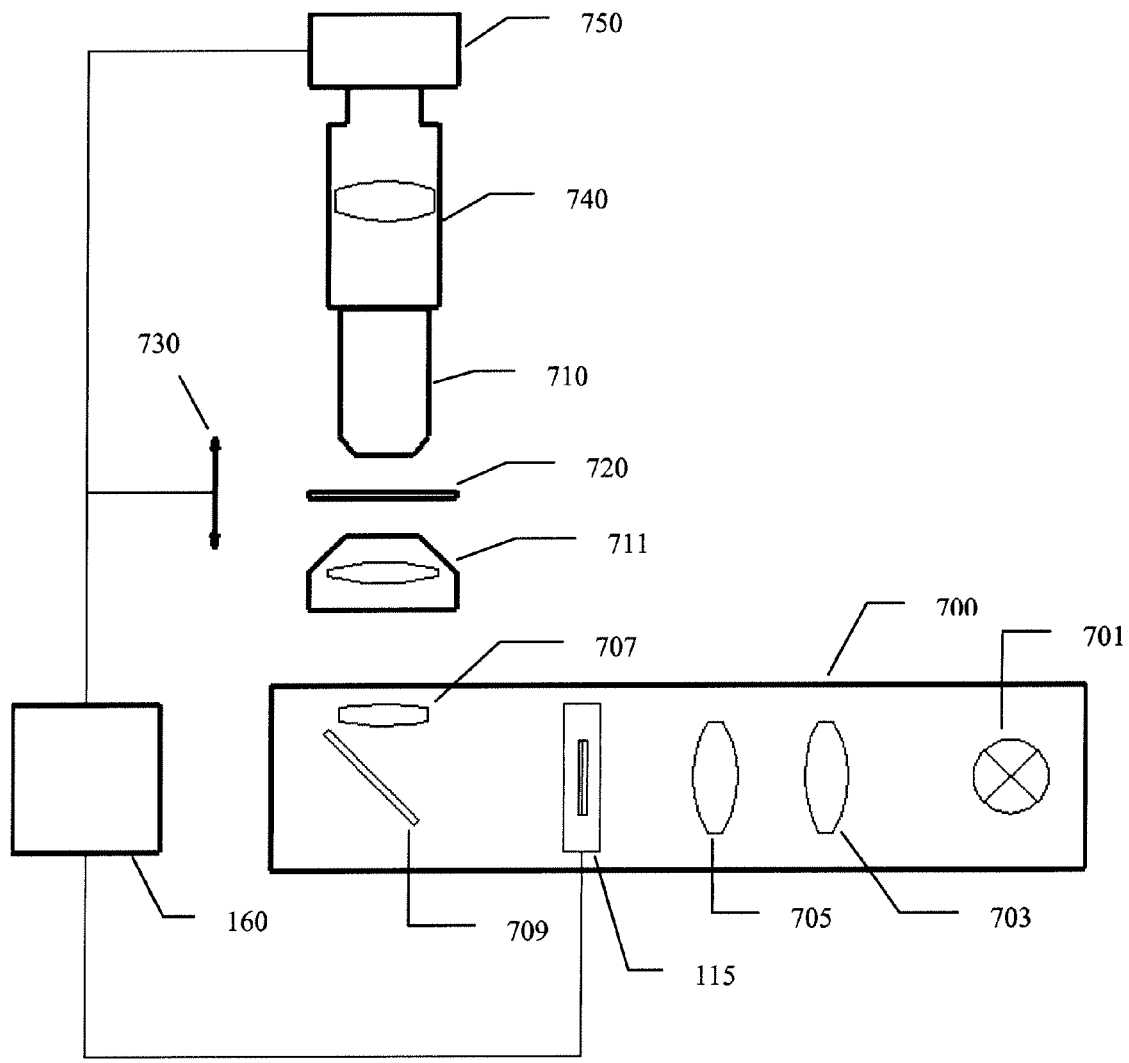
FIG. 7 is a block diagram illustrating a 3-D optical microscope with a transmitted illuminator in accordance with a third embodiment of the present invention.

A third embodiment of the present invention, shown in FIG. 7, is a 3-D optical microscope with a transmitted illuminator. A microscope operating in transmitted illumination mode is often used for studying transparent objects such as biology related samples. Transmitted illuminator 700 provides illumination for the microscope and contains several components. Light source 701 generates illuminating light. Among possible choices for the light source are: a lamp, a fiber coupled light, a LED light, a laser, and etc. In the preferred embodiment, either a halogen lamp or a fiber coupled light source is used. Lenses 703, 705, 707, and 711 ensure uniform illumination on sample 720 and, when pattern generator 115 is placed in the illuminator optical path, project an image of the patterned article to the focal plane of objective lens 710. Beam-splitter 709 is mounted at a 45° angle with respect to a centerline connecting lenses 703 and 705 so that light from the light source is directed vertically upward to the objective lens 710.

Positioning means 730 is provided to change the relative position between sample 720 and objective lens 710. As a result, different features on the sample can be brought into focus of objective lens 710. As an option, a XY stage (not shown) can be incorporated into the microscope of FIG. 7 to move sample 720 around in a horizontal plane. Condenser lens 711 and sample 720 moves in tandem under the command of positioning means 730. In the preferred embodiment, positioning means 730 is a motorized Z stage. There are, of course, other ways to vary the relative position between sample 720 and objective lens 710. For example, objective lens 710 could be mounted on a piezoelectric actuator. In such an arrangement, the sample remains stationary while the objective lens moves up and down. It is understood by those skilled in the art that these variations are within the scope of this invention. Coupler 740 in conjunction with objective lens 710 yields an image of the sample on optical sensor 750. In the preferred embodiment, optical sensor 750 is either a CCD or a CMOS camera. Processor 160 is connected to the 3-D optical microscope of FIG. 7. Said processor is used to control positioning means 730, pattern generator 115, and optical sensor 750. In addition, said processor analyzes data and creates a 3-D image of a sample. In the preferred embodiment, said process is a personal computer.

There are alternative ways to design transmitted illuminator 700. For example, one can use a light source and less than three lenses to project an image of a patterned article onto the focal plane of an objective lens. One can also use a light source and more than three lenses to create multiple field-conjugate planes where he can place a patterned article and have its image projected onto the focal plane of an objective lens. It is understood that these alternative illuminator designs are also within the scope of the present invention.

Figure 8:
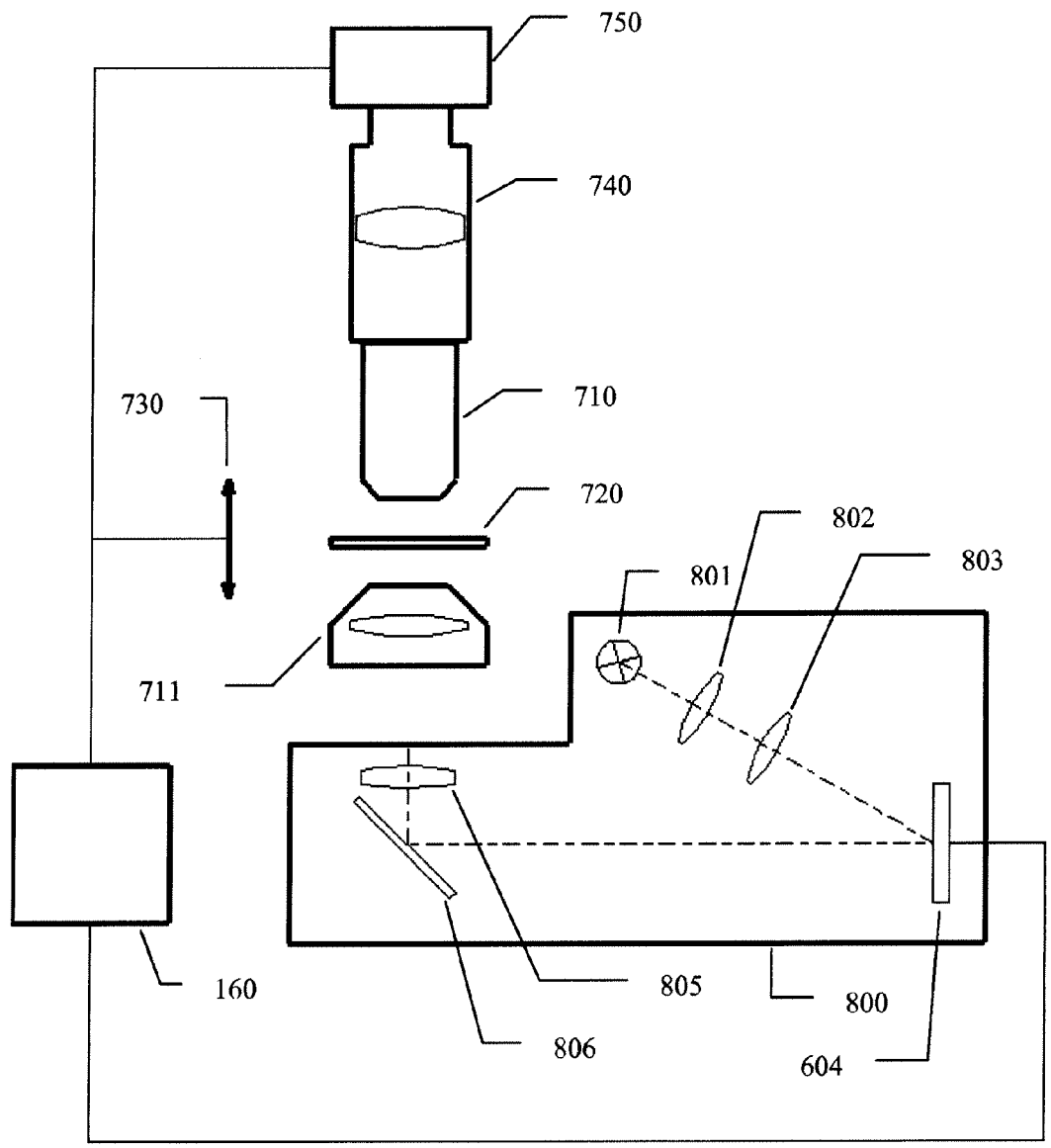
FIG. 8 is a block diagram illustrating a 3-D optical microscope with a transmitted illuminator in accordance with a fourth embodiment of the present invention.

FIG. 8 is a diagram illustrating a 3-D optical microscope with a transmitted illuminator in accordance with a fourth embodiment of the present invention. The main difference between this embodiment and the third embodiment illustrated in FIG. 7 is in illuminator design. Illuminator 800 provides illumination for the microscope and contains several components, one of which is an electronic pattern generator 604. Light source 801 generates illuminating light. Among possible choices for the light source are: a lamp, a fiber coupled light, a LED light, a laser, and etc. In the preferred embodiment, either a halogen lamp or a fiber coupled light source is used. Lenses 802, 803, 805, and 711 ensure a uniform illumination on sample 720 and, when electronic pattern generator 604 acts like a patterned article, project an image of the patterned article to the focal plane of objective lens 710. Beam-splitter 806 is mounted at a 45° angle with respect to a horizontal direction so that light from the light source is directed vertically upward to objective lens 710.

Positioning means 730 is provided to change the relative position between sample 720 and objective lens 710. As a result, different features on the sample can be brought into focus of objective lens 710. In the preferred embodiment, positioning means 730 is a motorized Z stage. As an option, a XY stage (not shown) can be incorporated into the microscope of FIG. 8 to move sample 720 around in a horizontal plane. There are, of course, other ways to vary the relative position between sample 720 and objective lens 710. For example, objective lens 710 could be mounted on a piezoelectric actuator. In such an arrangement, sample 720 remains stationary while objective lens 710 moves up and down. It is understood by those skilled in the art that these variations are within the scope of this invention. Coupler 740 in conjunction with objective lens 710 yields an image of sample 720 on optical sensor 750. In the preferred embodiment, optical sensor 750 is either a CCD or a CMOS camera. Processor 160 is connected to the 3-D optical microscope of FIG. 8. Said processor is used to control positioning means 730, electronic pattern generator 604, and optical sensor 750. In addition, said processor analyzes data and creates a 3-D image of the sample. In the preferred embodiment, said process is a personal computer.

Figure 9A:
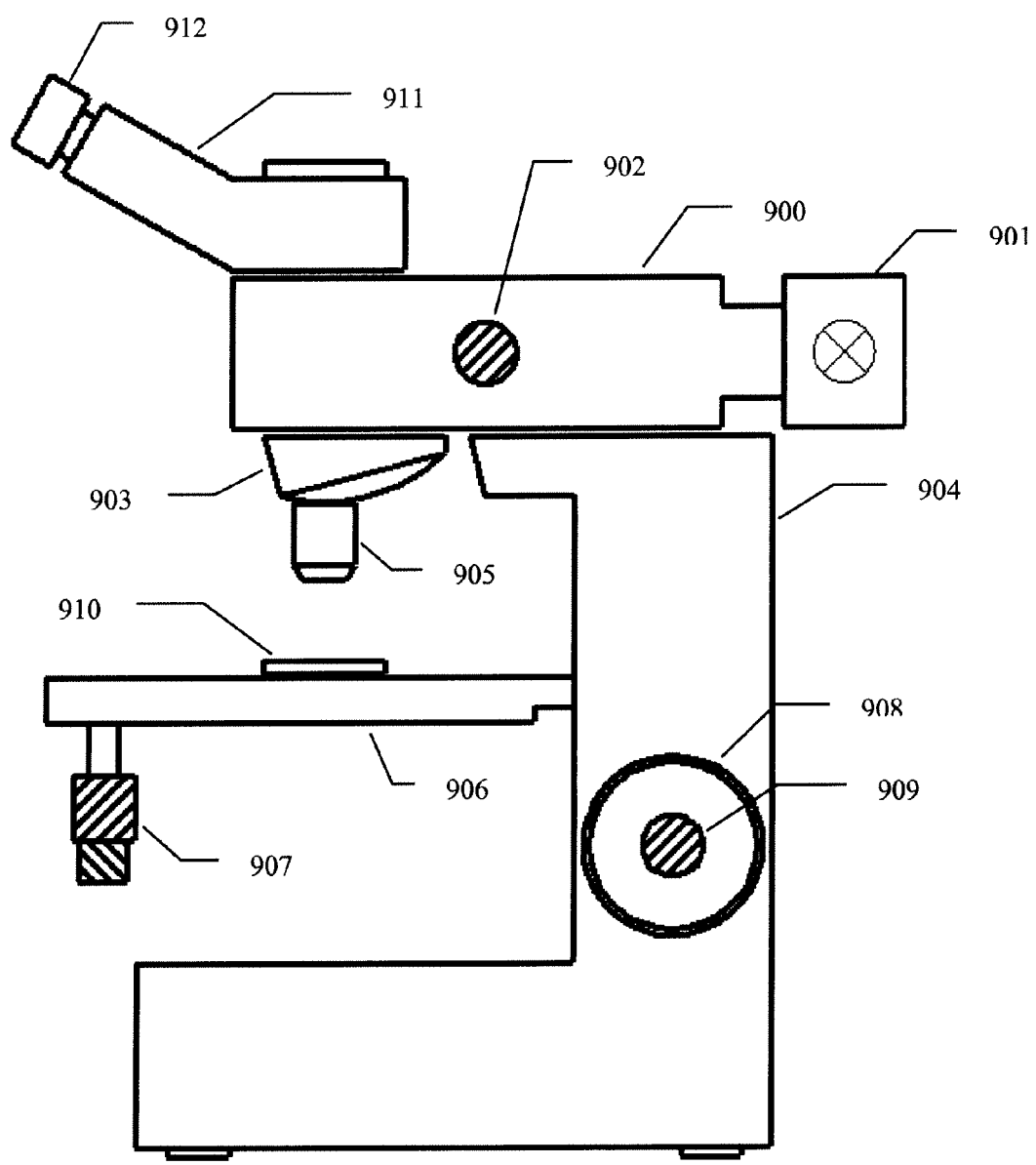
FIG. 9A is a diagram illustrating major components of a conventional optical microscope with a reflective illuminator.

FIG. 9A is a diagram illustrating a conventional optical microscope with a reflective illuminator. Illuminator 900 typically includes a field-stop 902 (F-Stop). Light source 901 is attached onto the illuminator. Objective turret 903, often with 4 to 6 mounting holes, is attached to microscope body 904. Objective lens 905 is threaded into one of the mounting holes of objective turret 903. Sample stage 906 can move in X and Y direction with turning knob 907 and move in vertical (Z) direction with focusing knobs 908 or 909. Focusing knob 908 can initiate large step moves in the Z direction and therefore is often called coarse focus knob. Focusing knob 909 performs small step moves in the Z direction and therefore is often called fine focus knob. Sample 910 is seated on sample stage 906. Trinocular tube 911 is attached to illuminator 900. Two identical eyepieces 912 slide into two of the three openings on the trinocular tube. An operator can view the sample through the eyepieces. The third opening on the trinocular tube is reserved for adding a camera which is optional for a conventional microscope.

Figure 9B:
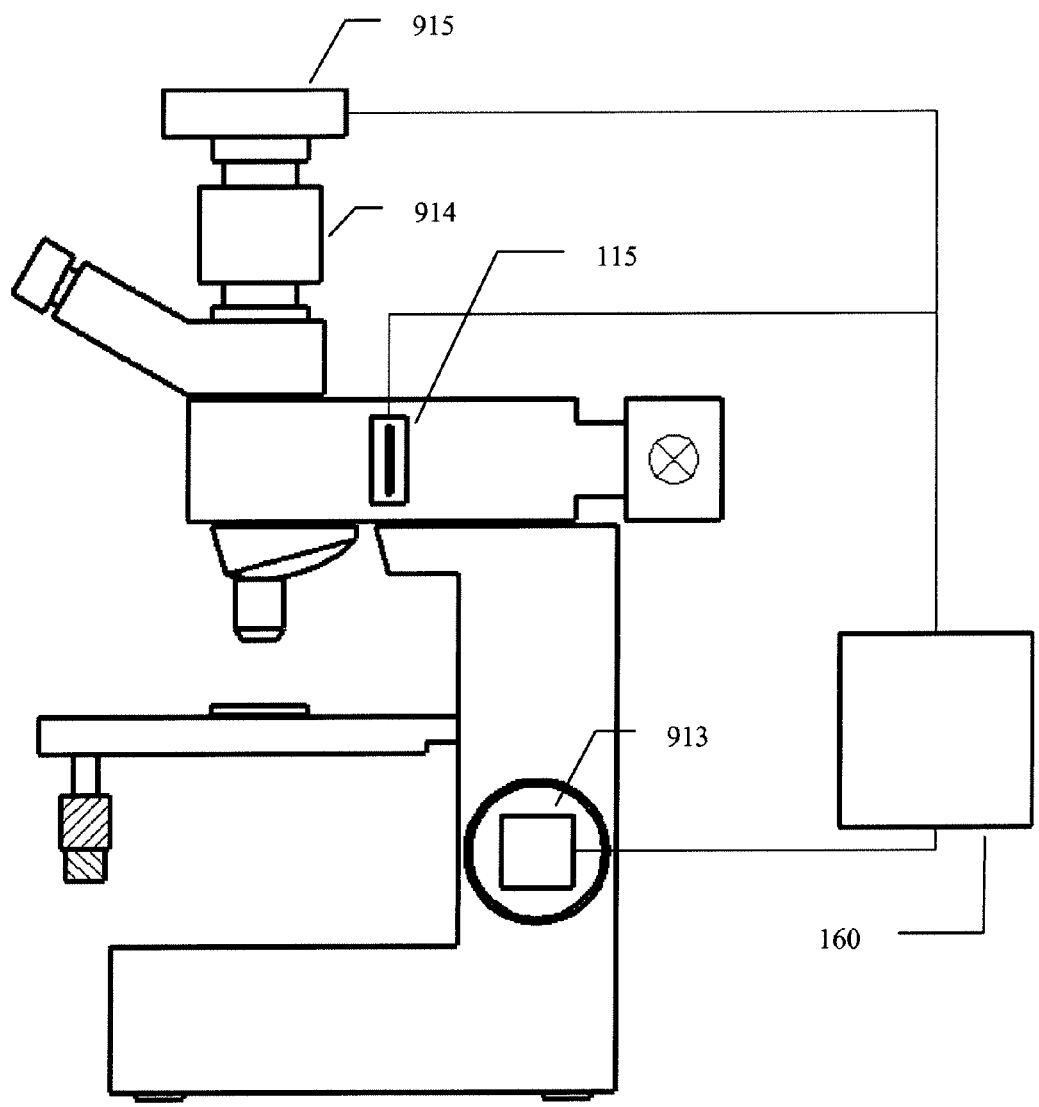
FIG. 9B is a diagram illustrating modifications made to the conventional optical microscope of FIG. 9A to turn it into a 3-D optical microscope in accordance with a fifth embodiment of the present invention.

FIG. 9B illustrates modifications made to a conventional microscope of FIG. 9A in order to turn it into a 3-D optical microscope in accordance with a fifth embodiment of the present invention. F-stop 902 of FIG. 9A is replaced by pattern generator 115 of FIG. 1A. Means for focusing adjustment 913 is implemented either on fine focus knob 909 or on objective turret 903 of FIG. 9A. Some examples of means for focusing adjustment are electrical motor, piezoelectric actuator, and etc. In the preferred embodiment, means for focusing adjustment 913 is a motor coupled to fine focus knob 909 of FIG. 9A. It is understood that other means of focusing adjustment is also within the scope of the present invention. Coupler 914 is mounted on trinocular tube 911 and camera 915 is attached to coupler 914. Finally, processor 160 is connected to the modified microscope of FIG. 9B. The processor is used to control means for focusing adjustment 913, camera 915, and pattern generator 115. In addition, said processor analyzes data and creates a 3-D image of the sample. In the preferred embodiment, processor 160 is a personal computer.

Figure 9C:
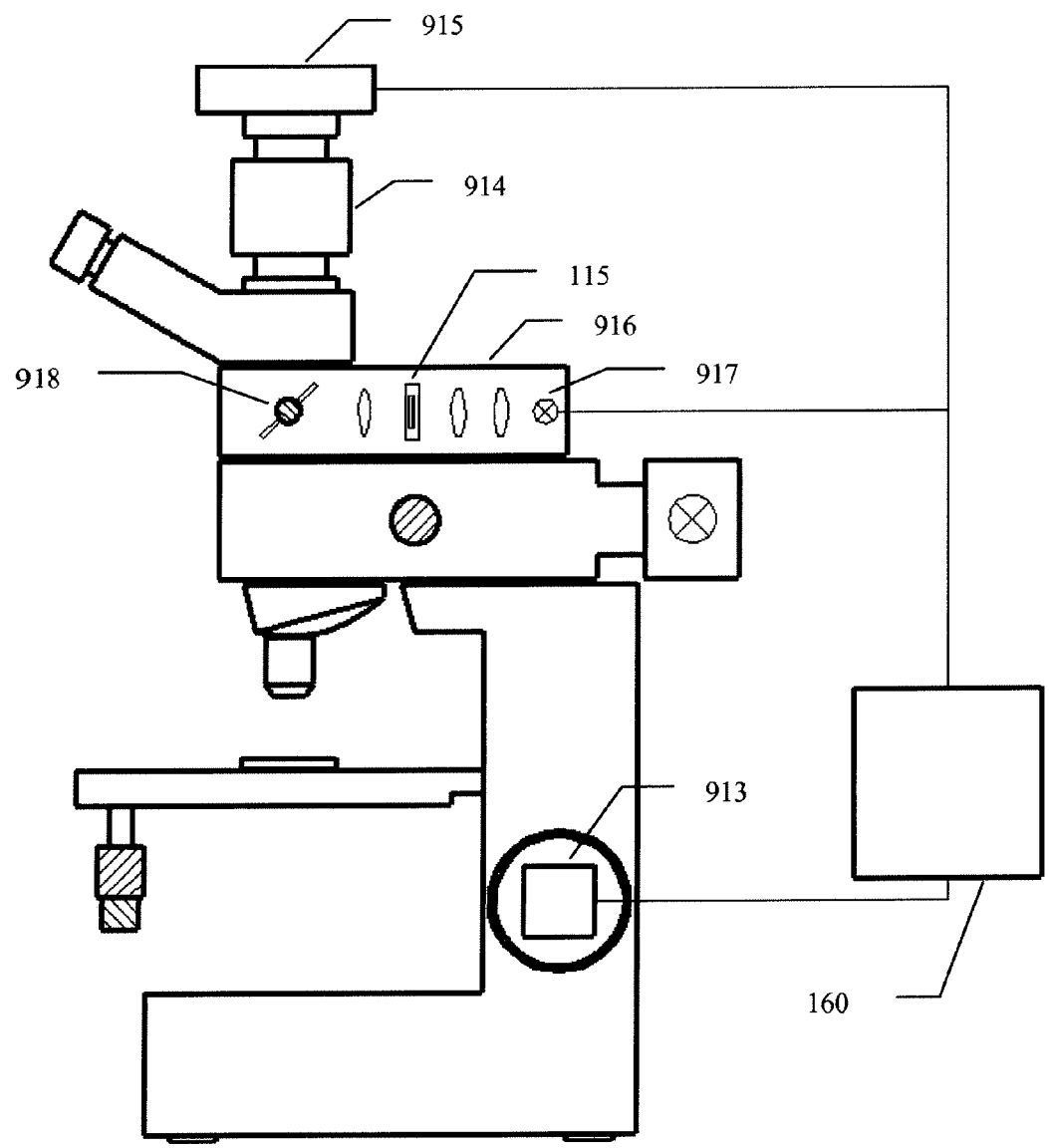
FIG. 9C is a diagram illustrating modifications made to the conventional optical microscope of FIG. 9A to turn it into a 3-D optical microscope in accordance with a sixth embodiment of the present invention.

FIG. 9C illustrates modifications made to a conventional microscope of FIG. 9A in order to turn it into a 3-D optical microscope in accordance with a sixth embodiment of the present invention. Illuminator 916 is added on top of the original illuminator of the conventional microscope of FIG. 9A. This extra illuminator provides a means for projecting an image of a pattern created by pattern generator 115 onto and to removing the image of the pattern from the focal plane of the objective lens. The optical design of illuminator 916 is very similar to that of illuminator 100. For example, both illuminators have the same lenses, the same 45-degree beam-splitter, the same pattern generator, and the same optical layout. Illuminator 916 has a pull lever 918 attached to the 45-degree beam-splitter. In addition, light source 917, instead of pattern generator 115, is connected to processor 160. In the preferred embodiment, pattern generator 115 is a mechanical pattern generator with its patterned article permanently placed in the optical path of illuminator 916. The means for projecting and removing an image of the patterned article from the focal plane of the objective lens is by turning light source 917 on and off. Among possible choices for the light source are: a lamp, a fiber coupled light, a LED light, a laser, and etc. In the preferred embodiment, light source 917 is a LED light source capable of turning on and off at high speed.

Pull level 918 is used to pull the 45-degree beam-splitter out of the optical path of illuminator 916 when the microscope is operating in dark-field mode. Means for focusing adjustment 913 is implemented either on fine focus knob 909 or on objective turret 903 of FIG. 9A. Some examples of means for focusing adjustment are electrical motor, piezoelectric actuator, and etc. In the preferred embodiment, means for focusing adjustment is a motor coupled to fine focus knob 909 of FIG. 9A. It is understood that other means of focusing adjustment is within the scope of the present invention. Coupler 914 is mounted on trinocular tube 911 of FIG. 9A and camera 915 is attached to coupler 914. Finally, processor 160 is connected to the modified microscope of FIG. 9C. The processor is used to control means for focusing adjustment 913, camera 915, and light source 917. In addition, said processor analyzes data and creates a 3-D image of the sample. In the preferred embodiment, processor 160 is a personal computer. It is understood that illuminators 100 and 600 can replace illuminator 916 in the current embodiment. If such replacement were to occur, means for projecting and removing an image of a patterned article would have to be implemented on pattern generators 115 and 604 respectively.

Figure 10A:
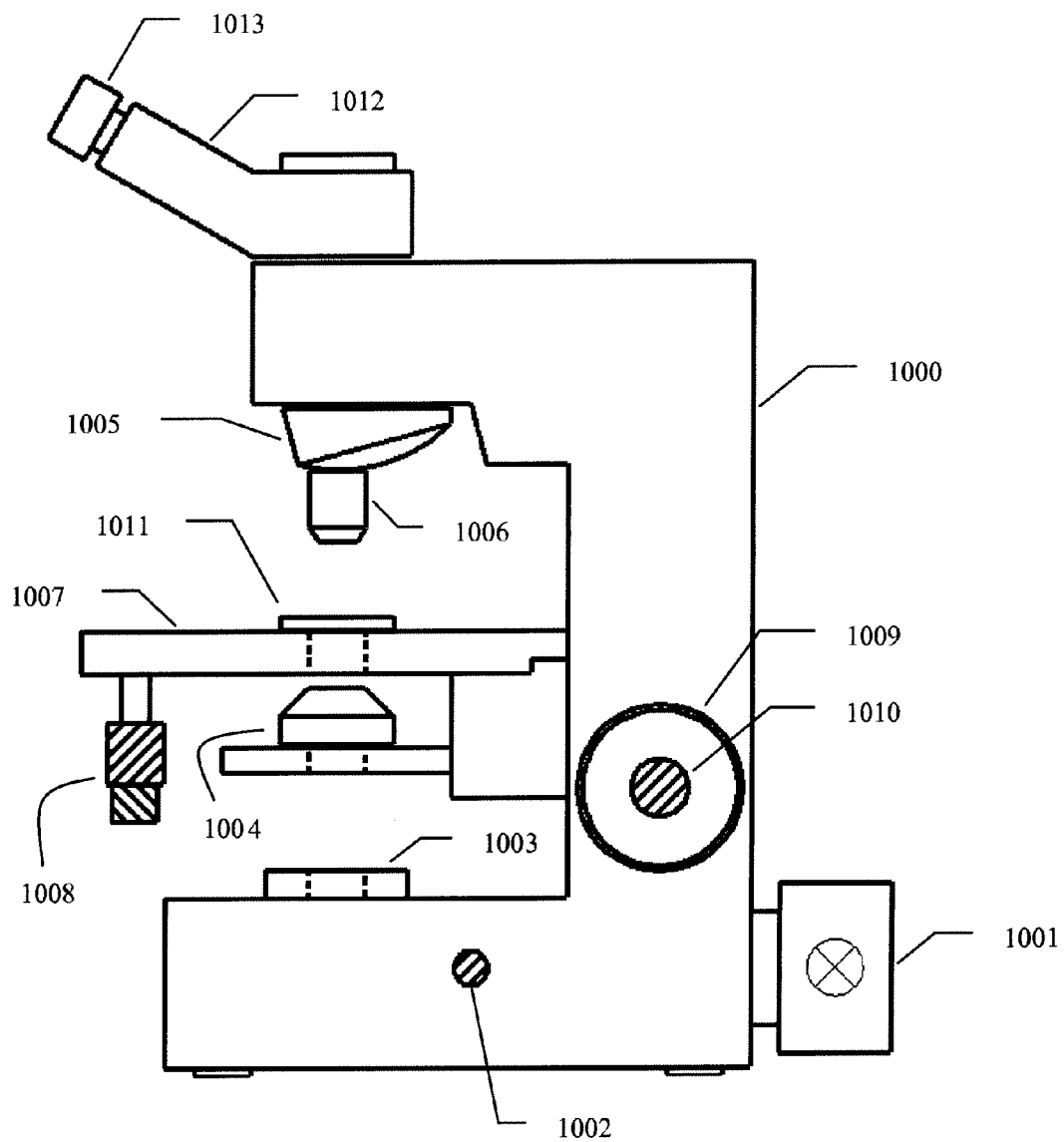
FIG. 10A is a diagram illustrating major components of a conventional optical microscope with a transmitted illuminator.

FIG. 10A is a diagram illustrating a conventional optical microscope with a transmitted illuminator. A substantial portion of the illuminator is hidden inside microscope body 1000. Some visible components of the illuminator typically include a field-stop 1002 (F-Stop), lens 1003, and condenser lens 1004. Light source 1001 is mounted to the entrance of the illuminator. Objective turret 1005, often with 4 to 6 mounting holes, is attached to microscope body 1000. Objective lens 1006 is threaded into one of the mounting holes of objective turret 1005. Sample stage 1007 can move in X and Y direction with turning knob 1008 and move in vertical (Z) direction with focusing knobs 1009 or 1010. Focusing knob 1009 can initiate large step moves in the Z direction and therefore is often called coarse focus knob. Focusing knob 1010 performs small step moves in the Z direction and therefore is often called fine focus knob. Sample 1011 is mounted on sample stage 1007. Condenser lens 1004 and sample stage 1007 travel in the Z direction together under the command of focusing knobs 1009 and 1010. Trinocular tube 1012 is attached to microscope body 1000. Two identical eyepieces 1013 slide into two of the three openings on the trinocular tube. An operator can view the sample through the eyepieces. The third opening on the trinocular tube is reserved for adding a camera which is optional for a conventional microscope.

Figure 10B:
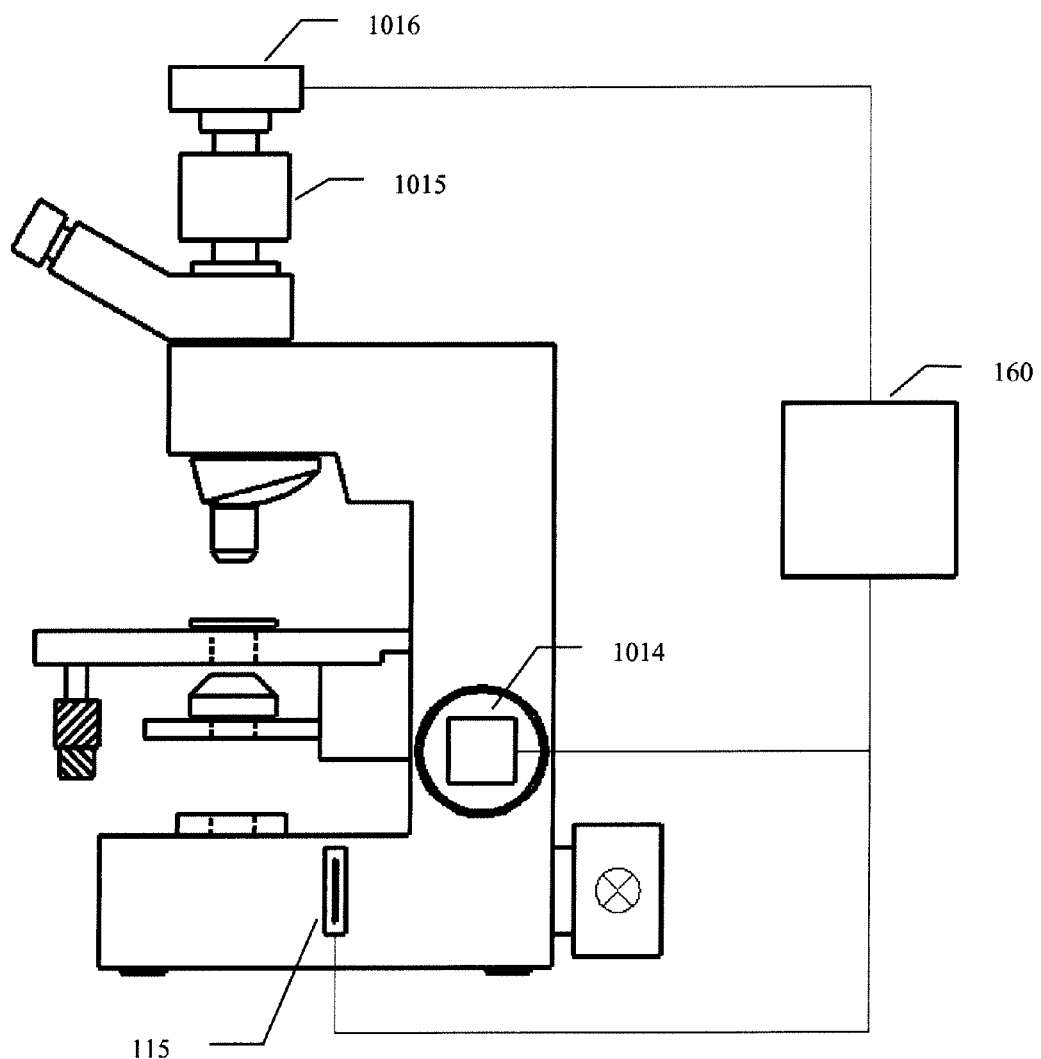
FIG. 10B is a diagram illustrating modifications made to the conventional optical microscope of FIG. 10A to turn it into a 3-D optical microscope in accordance with a seventh embodiment of the present invention.

FIG. 10B illustrates modifications made to a conventional microscope of FIG. 10A in order to turn it into a 3-D optical microscope in accordance with a seventh embodiment of the present invention. F-stop 1002 of FIG. 10A is replaced by pattern generator 115 of FIG. 1A. Means for focusing adjustment 1014 is implemented either on fine focus knob 1010 or on objective turret 1005 of FIG. 10A. Some examples of means for focusing adjustment are electrical motor, piezoelectric actuator, and etc. In the preferred embodiment, means for focusing adjustment 1014 is a motor coupled to fine focus knob 1010 of FIG. 10A. It is understood that other means for focusing adjustment is within the scope of the present invention. Coupler 1015 is mounted on trinocular tube 1012 of FIG. 10A and camera 1016 is attached to coupler 1015. Finally, processor 160 is connected to the modified microscope of FIG. 10B. The processor is used to control means for focusing adjustment 1014, camera 1016, and pattern generator 115. In addition, said processor analyzes data and creates a 3-D image of the sample. In the preferred embodiment, processor 160 is a personal computer.

Figure 10C:
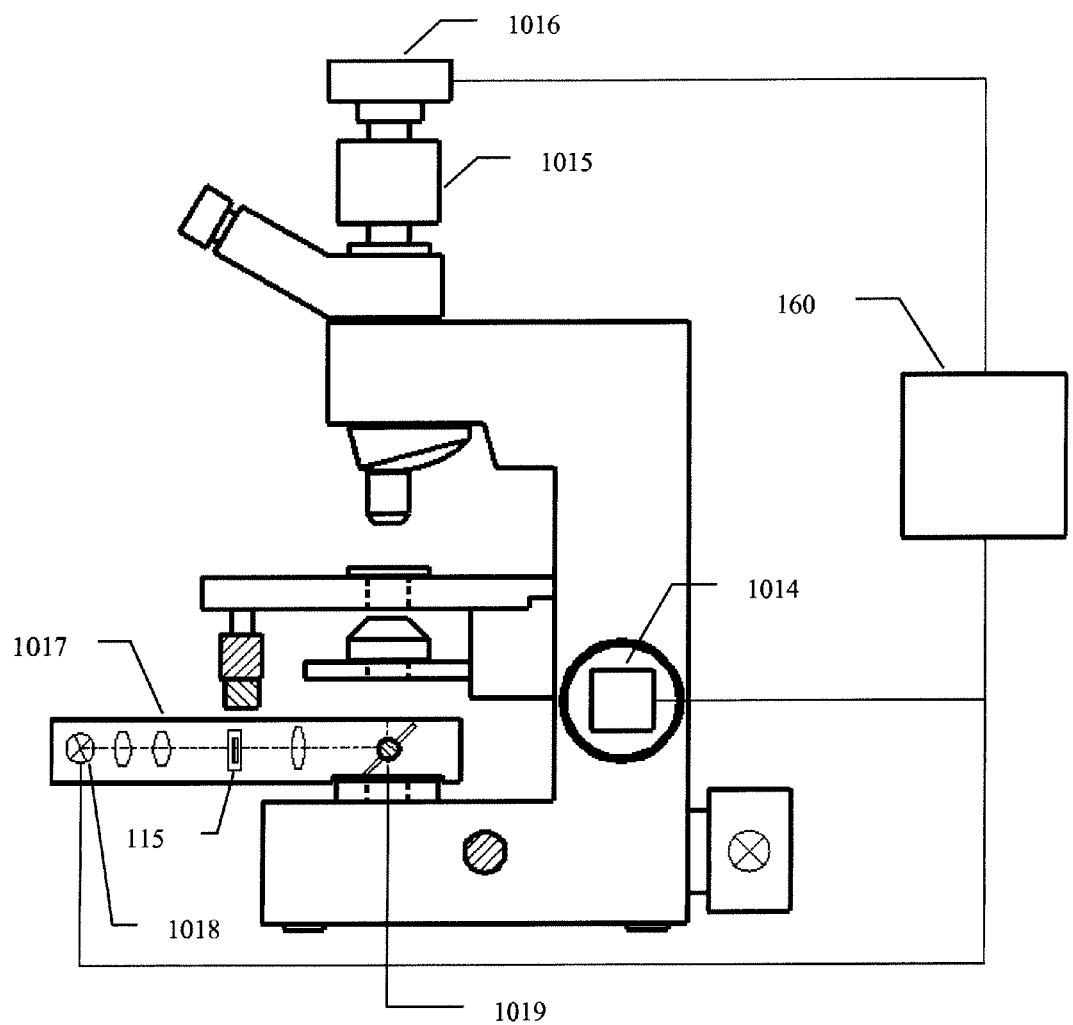
FIG. 10C is a diagram illustrating modifications made to the conventional optical microscope of FIG. 10A to turn it into a 3-D optical microscope in accordance with a eighth embodiment of the present invention.

FIG. 10C illustrates modifications made to a conventional microscope of FIG. 10A in order to turn it into a 3-D optical microscope in accordance with a eighth embodiment of the present invention. Illuminator 1017 is added on top of the original illuminator of the conventional microscope of FIG. 10A. This extra illuminator provides a means for projecting an image of a pattern created by pattern generator 115 onto and for removing the image of the pattern from the focal plane of the objective lens. The optical design of illuminator 1017 is very similar to that of illuminator 100. For example, both illuminators have the same lenses, the same 45-degree beam-splitter, the same pattern generator, and the same optical layout. Illuminator 1017 has a pull lever 1019 attached to the 45-degree beam-splitter. In addition, light source 1018, instead of pattern generator 115, is connected to processor 160. In the preferred embodiment, pattern generator 115 is a mechanical pattern generator with its patterned article permanently placed in the optical path of illuminator 1017. The means for projecting and removing an image of the patterned article from the focal plane of the objective lens is by turning light source 1018 on and off. Among possible choices for the light source are: a lamp, a fiber coupled light, a LED light, a laser, and etc. In the preferred embodiment, light source 1018 is a LED light source capable of turning on and off at high speed.

Pull lever 1019 is used to pull the 45-degree beam-splitter out of the optical path of illuminator 1017 when the microscope is operating in dark-field mode. Means for focusing adjustment 1014 is implemented either on fine focus knob 1010 or on objective turret 1005 of FIG. 10A. Some examples of means for focusing adjustment are electrical motor, piezoelectric actuator, and etc. In the preferred embodiment, means for focusing adjustment is a motor coupled to fine focus knob 1010 of FIG. 10A. It is understood that other means of for focusing adjustment is within the scope of the present invention. Coupler 1015 is mounted on trinocular tube 1012 of FIG. 10A and camera 1016 is attached to coupler 1015. Finally, processor 160 is connected to the modified microscope of FIG. 10C. The processor is used to control means for focusing adjustment 1014, camera 1016, and light source 1018. In addition, said processor analyzes data and creates a 3-D image of the sample. In the preferred embodiment, processor 160 is a personal computer.

Figure 10D:
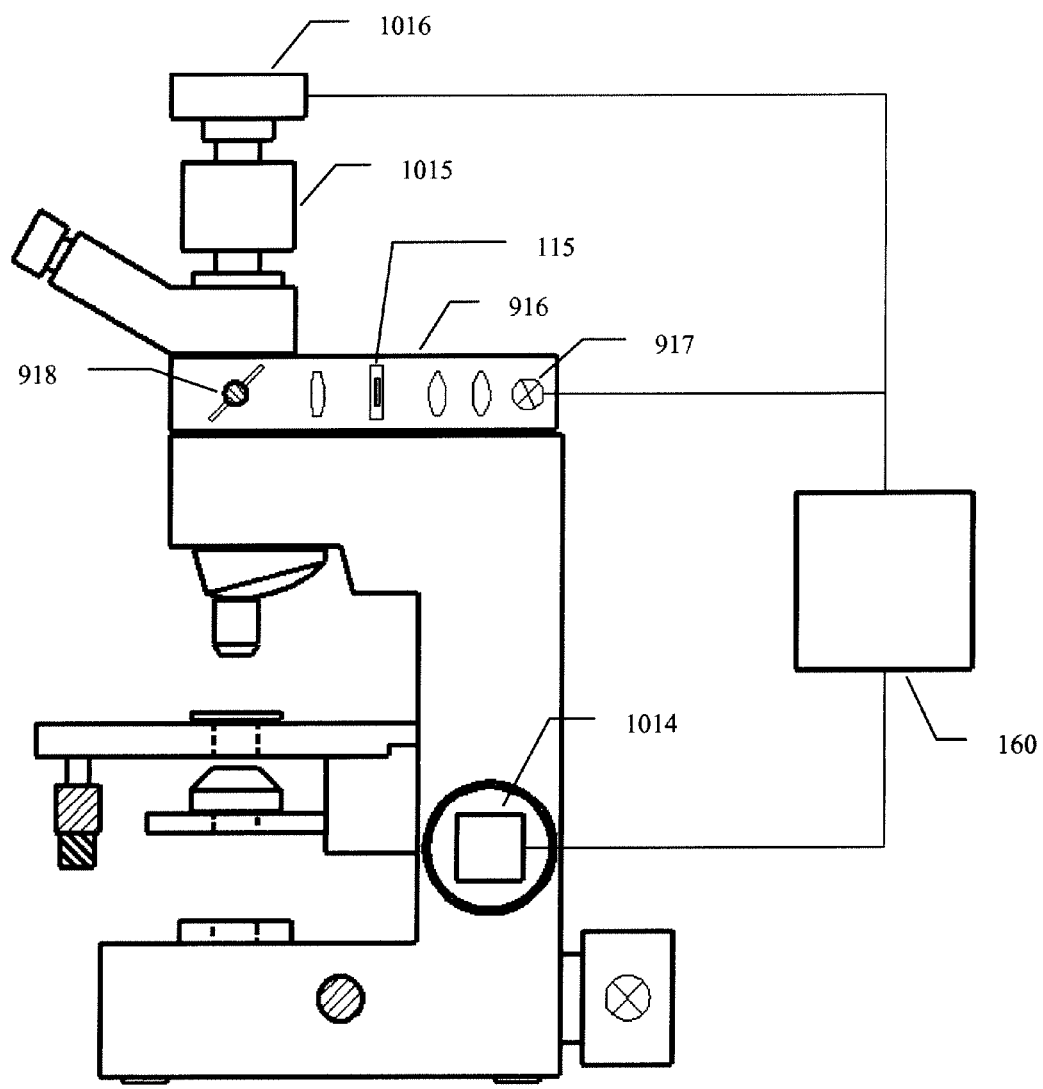
FIG. 10D is a diagram illustrating modifications made to the conventional optical microscope of FIG. 10A to turn it into a 3-D optical microscope in accordance with a ninth embodiment of the present invention.

FIG. 10D illustrates modifications made to a conventional microscope of FIG. 10A in order to turn it into a 3-D optical microscope in accordance with a ninth embodiment of the present invention. Illuminator 916 is added on top of the original illuminator of the conventional microscope of FIG. 10A. This extra illuminator provides a means for projecting an image of a pattern created by pattern generator 115 onto and to removing the image of the pattern from the focal plane of the objective lens. In the preferred embodiment, pattern generator 115 is a mechanical pattern generator with its patterned article permanently placed in the optical path of illuminator 916. The means for projecting and removing an image of the patterned article from the focal plane of the objective lens is by turning light source 917 on and off. Among possible choices for the light source are: a lamp, a fiber coupled light, a LED light, a laser, and etc. In the preferred embodiment, light source 917 is a LED light source capable of turning on and off at high speed.

Pull lever 918 is used to pull the 45-degree beam-splitter out of the optical path of illuminator 916 when the microscope is operating in dark-field mode. Means for focusing adjustment 1014 is implemented either on fine focus knob 1010 or on objective turret 1005 of FIG. 10A. Some examples of means for focusing adjustment are electrical motor, piezoelectric actuator, and etc. In the preferred embodiment, means for focusing adjustment is a motor coupled to fine focus knob 1010 of FIG. 10A. It is understood that other means for focusing adjustment is within the scope of the present invention. Coupler 1015 is mounted on trinocular tube 1012 of FIG. 10A and camera 1016 is attached to coupler 1015. Finally, processor 160 is connected to the modified microscope of FIG. 10D. The processor is used to control means for focusing adjustment 1014, camera 1016, and light source 917. In addition, said processor analyzes data and creates a 3-D image of the sample. In the preferred embodiment, processor 160 is a personal computer. It is understood that illuminators 100 and 600 can replace illuminator 916 in the current embodiment. If such replacement were to occur, means for projecting and removing an image of a patterned article would have to be implemented on pattern generators 115 and 604 respectively.

Operation principles of the 3-D microscopes in accordance with a second, third, fourth, fifth, sixth, seventh, eighth, and ninth embodiment of the present invention are similar to that of the first embodiment. Since we have described the latter in great detail, we will not repeat the same description here. The key points are: (1) when a mechanical pattern generator is used, creating a 3-D image using the microscopes of FIG. 1A, FIG. 7, FIG. 9B, and FIG. 10B in accordance with the present invention involves the aforementioned two-pass image acquisition process of FIG. 5A and subsequent data analysis process of FIG. 5C. (2) When an electronic pattern generator is used, creating a 3-D image using the microscopes of FIG. 1A, FIG. 6, FIG. 7, FIG. 8, FIG. 9B, and FIG. 10B in accordance with the present invention involves the aforementioned one-pass image acquisition process of FIG. 5B and subsequent data analysis process of FIG. 5C. (3) Although a mechanical pattern generator is used, creating a 3-D image using the microscopes of FIG. 9C, FIG. 10C and FIG. 10D in accordance with the present invention involves the aforementioned one-pass image acquisition process of FIG. 5B and subsequent data analysis process of FIG. 5C. The reason is that on these particular microscopes, projecting and removing an image of a patterned article can be done electronically by turning the light source on and off.

The modifications of the microscopes of FIGS. 9B to 9C and FIGS. 10B to 10D in accordance with the present invention can be implemented easily and economically on almost all conventional optical microscopes as long as they have a fine focus knob. This is a big advantage over prior art related to confocal microscopy. A confocal microscope is relatively expensive to build. It is not easy and in many cases impossible to turn an existing optical microscope into a confocal microscope. With the present invention, however, an existing optical microscope can be easily turned into a 3-D optical microscope with just a few simple modifications.

The invention claimed is:

1. A method of generating a three-dimensional (3-D) image of a sample using an optical microscope, the method comprising:
    projecting a pattern onto a focal plane of an objective lens of the optical microscope;
    varying a relative distance between the sample and the objective lens at pre-determined steps;
    capturing a first set of images of the sample with the pattern at each pre-determined step;
    recording the relative distance at each step;
    removing the pattern from the focal plane of the objective lens;
    repeating varying the relative distance between the sample and the objective lens at the predetermined steps;
    capturing a second set of images of the sample without the pattern at each step while still being illuminated;
    analyzing the first set of images and the second set of images to extract first cumulative information and second cumulative information, respectively; and
    using the first cumulative information and the second cumulative information for generating pixels of the 3-D image.

2. The method of claim 1, further including resetting image sensor parameters after removing the pattern from the focal plane of the objective lens.

3. The method of claim 1, wherein analyzing includes:
    extracting contrast information from the first set of images;
    generating a depth profile of the sample using the contrast information;
    extracting image intensity information from the second set of images; and
    combining the depth profile and the image intensity information to create the 3-D image of the sample.

4. The method of claim 3, wherein extracting contrast information includes using a maximum gradient approach.

5. The method of claim 1, wherein analyzing includes:
    extracting contrast information from the first set of images;
    generating a depth profile of the sample using the contrast information;
    extracting color values from the second set of images; and
    combining the depth profile and the color values to create the 3-D image of the sample.

6. The method of claim 5, wherein extracting contrast information includes using a maximum gradient approach.

7. A method of generating a three-dimensional (3-D) image of a sample using an optical microscope, the method comprising:
    varying a relative distance between the sample and an objective lens of the optical microscope at pre-determined steps;
    at one or more of the pre-determined steps:
        projecting a pattern onto a focal plane of the objective lens;
        capturing a first image of the sample with the pattern;
        storing the first image in a first image array;
        removing the pattern from the focal plane of the objective lens;
        capturing a second image of the sample without the pattern; and
        storing the second image in a second image array;
    generating a depth profile using the first image array;
    generating image intensity using the second image array; and
    combining the depth profile and the image intensity to generate the 3-D image of the sample.

8. The method of claim 7, wherein projecting the pattern onto the focal plane is performed by electronic pattern generation.

9. The method of claim 7, wherein generating the depth profile includes extracting contrast information from the first image array using a maximum gradient approach.

10. A method of generating a three-dimensional (3-D) image of a sample using an optical microscope, the method comprising:

varying a relative distance between the sample and an objective lens of the optical microscope at pre-determined steps;
at one or more of the pre-determined steps:
  projecting a pattern onto a focal plane of the objective lens;
  capturing a first image of the sample with the pattern;
  storing the first image in a first image array;
  removing the pattern from the focal plane of the objective lens;
  capturing a second image of the sample without the pattern; and
  storing the second image in a second image array;
  generating a depth profile using the first image array;
  generating color values using the second image array; and
  combining the depth profile and the color values to generate the 3-D image of the sample.

11. The method of claim 10, wherein projecting the pattern onto the focal plane is performed by electronic pattern generation.

12. The method of claim 10, wherein generating the depth profile includes extracting contrast information from the first image array using a maximum gradient approach.

* * * * *